(12) United States Patent
Robinson et al.

(10) Patent No.: US 12,254,873 B1
(45) Date of Patent: Mar. 18, 2025

(54) NATURAL LANGUAGE SURVEY SYSTEM

(71) Applicant: Prime Research Solutions LLC, Flushing, NY (US)

(72) Inventors: Jonathan Robinson, Flushing, NY (US); Leonid Litman, Bronx, NY (US); Reuben Paris, Flushing, NY (US)

(73) Assignee: Prime Research Solutions LLC, Flushing, NY (US)

( * ) Notice: Subject to any disclaimer, the term of this patent is extended or adjusted under 35 U.S.C. 154(b) by 0 days.

(21) Appl. No.: 18/934,453

(22) Filed: Nov. 1, 2024

Related U.S. Application Data

(63) Continuation-in-part of application No. 18/766,833, filed on Jul. 9, 2024.

(51) Int. Cl.
*G10L 15/00* (2013.01)
*G10L 15/183* (2013.01)
(Continued)

(52) U.S. Cl.
CPC ............ *G10L 15/183* (2013.01); *G10L 15/22* (2013.01); *G10L 15/30* (2013.01); *G10L 15/16* (2013.01); *G10L 15/26* (2013.01); *G10L 25/30* (2013.01)

(58) Field of Classification Search
CPC .. H03M 2201/40; G06F 16/685; G06F 40/30; G06F 40/268; G10L 15/16; G10L 25/27; G10L 25/30; G10L 19/005; G10L 19/00; G10L 15/12; G10L 15/02; G10L 15/063; G10L 15/07; G10L 15/20; G10L 15/22; G10L 15/26; G10L 15/30; G10L 15/08; G10L 15/1822; G10L 15/183; G10L 15/193; G10L 15/19; G10L 25/78; G10L 25/87; G10L 21/0208
See application file for complete search history.

(56) References Cited

U.S. PATENT DOCUMENTS

| 12,050,854 B1 | 7/2024 | Shan et al. |
| 2005/0197988 A1 | 9/2005 | Bublitz |

(Continued)

FOREIGN PATENT DOCUMENTS

KR 20230084635 6/2023

OTHER PUBLICATIONS

Yun et al., "Keeping Users Engaged During Repeated Administration of the Same Questionnaire: Using Large Language Models to Reliably Diversify Questions," arXiv, Nov. 21, 2023.

*Primary Examiner* — Vu B Hang
(74) *Attorney, Agent, or Firm* — Weiss & Arons LLP

(57) ABSTRACT

Systems and methods for a natural language survey system are provided. The natural language survey system may harness generative artificial intelligence ("AI") and machine learning to enhance survey question generation, survey participance and completed survey analysis and research. The natural language survey system may include a dynamic interactive platform. The dynamic interactive platform may enable a researcher to create a survey using natural language. The dynamic interactive platform may enable a researcher to directly identify survey goals instead of creating a plurality of goal-oriented specific questions. The dynamic interactive platform may enable a plurality of participants to participate in the survey. The dynamic interactive platform may provide reports and insights to the researcher upon completion of the survey by the participants.

19 Claims, 22 Drawing Sheets

(51) Int. Cl.
  *G10L 15/22* (2006.01)
  *G10L 15/30* (2013.01)
  *G10L 15/16* (2006.01)
  *G10L 15/26* (2006.01)
  *G10L 25/30* (2013.01)

(56) References Cited

U.S. PATENT DOCUMENTS

| | | |
|---|---|---|
| 2016/0203500 A1 | 7/2016 | Williams et al. |
| 2019/0066136 A1 | 2/2019 | Kopikare |
| 2020/0074294 A1 | 3/2020 | Long et al. |
| 2021/0360106 A1 | 11/2021 | Matula et al. |
| 2022/0300993 A1 | 9/2022 | Chaudhry et al. |
| 2023/0206262 A1 | 6/2023 | Bower et al. |
| 2024/0020715 A1 | 1/2024 | Childress |
| 2024/0403904 A1 | 12/2024 | Levitan et al. |

ATTRIBUTES OF A NATURAL LANGUAGE SURVEY SYSTEM

| AI Moderator (902) | AI Prespecified Personalities (904) | Engagement Score Subsystem (906) | Test Harness (908) |
|---|---|---|---|
| - Moderates survey/interview<br><br>- Identifies issues during interview<br><br>- Flags issues and moderates the issues<br><br>- Removes flagged issues from the study results | - A set of AI personalities test surveys prior to exposure to live subjects<br><br>- Represent various types of subjects | - Identifies a continuously updating engagement score that measures the extent that the participant is engaged in the survey<br><br>- Operates in real-time during communication between the survey taker and the natural language survey system<br><br>- Graphical display of real-time engagement score<br><br>- Tag each subject's response with a per-response engagement score and/or a cumulative engagement score<br><br>- Tag each completed survey with a final engagement score (cumulative of completed survey) | - Suite of tests/Set of tools to measure quality of system<br><br>- Measures system quality upon completion of surveys<br><br>- Tests the quality of a survey when using a first LLM to the quality of the same survey using a second LLM |

FIG. 9

1. Open-Ended ⌄

How often do you use the internet, and what are your primary reasons —1104
   for using it? —1106

Follow-Up Instructions*
   Tell Engage what your objectives are and how to follow up on this question —1108

This is just a background question. After the respondent answers this question "How often do you use the internet, and what are your primary reasons for using it?" there is no need for any follow-up questions unless they say something interesting about health or contraceptive use. Do not add any more follow up questions in this case.

2. Open-Ended ⌄

How you ever used the internet to look for information about birth control online?

—1102

Engage

6. Multi-Choice ⌄ ◯ Select One ⓘ
Overall, how was your experience taking this study? ⟵ 1304

Extremely good

Somewhat good

Neither good nor bad

Somewhat bad

Extremely bad

1306

7. Open-Ended
What went well?

Engage Off ⓘ

FIG. 13

7. Open-Ended ⌄

What went well? — 1404

— 1406

Engage Off ⓘ

— 1402

8. Multi-Choice ⌄  ⬭ Select One ⓘ

Would you take another study that used this AI tool (on a different topic)?

FIG. 14

8. Multi-Choice ⌄ ◯ Select One ⓘ — 1504

Would you take another study that used this AI tool (on a different topic)?

- Definitely yes
- Probably yes
- Might or might not
- Probably no
- Definitely no

— 1506
— 1508

Follow-Up Instructions*
Tell Engage what your objectives are and how to follow up on this question Engage ● ⓘ — 1510

If the answer is yes, probe to understand what they didn't like and how the AI interview system can be improved.

Perceptions Surrounding Colorectal Cancer... — 3.4

This theme explores participants' perceptions and actions regarding colorectal cancer screenings, especially in the absence of family history of the disease.

Details

Perceptions and Experiences of Colorectal Cancer... — 2.8

This theme explores individuals' understanding, experiences, and attitudes toward colorectal cancer screening, including their awareness of different types of tests and their motivations or barriers to them.

Details

Proactiveness in Early Detection and Health... — 1.7

This theme encompasses the respondents'

Familial Impact and Understanding of... — 1.0

This theme captures the confusion and

FIG. 17

Screening

The thematic analysis focused on responses to questions about family history of related screening behaviors. A notable trend emerged from the discussion, high concern or urgency about colorectal cancer screenings among participants with disease. This was particularly evident in the attitudes and perceptions towards...

Sub-themes:

- Lack of Family History as a Deciding Factor for Screening: The majority of family history of colorectal cancer, which they often cited as the main reason... considering screenings with healthcare professionals. One participant explicitly... discussed screenings due to being younger than 50 and lacking a family history... that screenings are unnecessary in the absence of direct familial experiences...

- Variability in Awareness and Action: There was a single instance of family... colorectal cancer, highlighting a contrast in the personal connection to the... necessarily translate into a more heightened concern or proactive behavior re... others in the family.

FIG. 18 colorectal cancer, highlighting a contrast in the personal connection to the... necessarily translate into a more heightened concern or proactive behavior re... others in the family.

1902

1904

Participant: 123ABC456   Status: Completed ⓘ

AI-Generated Summary

The participant's open-ended responses throughout the... commitment to answering questions candidly, though the.. generally limited, providing basic information with little.... were consistent and straightforward, focusing on the pa... attitudes and behaviors regarding health, specifically in... cancer, without venturing into broader reflections or det... structured nature of follow-up questions, the participant... offering concise answers that adhered closely to the que... level of cooperation with the interview process without r... follow-up interventions.

FIG. 19

NATURAL LANGUAGE SURVEY SYSTEM

CROSS-REFERENCE TO RELATED APPLICATION

This application is a continuation-in-part of U.S. patent application Ser. No. 18/766,833 filed on Jul. 9, 2024, and entitled "NATURAL LANGUAGE SURVEY SYSTEM" which is hereby incorporated by reference herein in its entirety.

FIELD OF TECHNOLOGY

Aspects of the disclosure relate to electronic survey administration and processing.

BACKGROUND OF THE DISCLOSURE

Electronically-administered surveys are a research medium. Electronically-administered surveys involve querying a population to perform research regarding one or more topics. Traditional electronically-administered online surveys (hereinafter, "online surveys") are a data collection method in which questionnaires are electronically sent to a sample of participants. Online surveys are administered to the participants with multiple-choice or open-ended questions. A multiple-choice question may have a limited set of selectable responses. An open-ended question may not be answered by selecting a limited set of selectable responses, rather an open-ended question may request a respondent to elaborate as a response.

A researcher typically prepares the multiple-choice or open-ended questions. Survey participants participate in the survey by providing responses to the questions included in the survey. Survey platforms which enable participants to participate in the survey include a website, email interaction, Internet, social media or other suitable platforms. The completed surveys, including the participant responses, are stored in databases.

The researcher typically analyzes the completed surveys. The analysis enables the researcher to address the validity of the researcher's hypothesis and/or gain insight on the research topic.

Online surveys may be used in a variety of fields. Such fields include customer surveys, human resource surveys, marketing surveys, academic surveys and healthcare surveys.

Customer surveys are designed to collect in-depth feedback from customers of an entity regarding the entity and/or the entity's products and services.

Human resource surveys are designed to understand the rhythm, morale and performance of the workforce in an entity. Human resource surveys collect feedback from employees regarding work habits and work-life balance.

Marketing surveys are designed to collect feedback about new initiatives, offerings and products provided by an entity. An example of a marketing survey includes a product registration survey.

Academic surveys are designed to enable educational institutions to research one or more topics. Academic surveys are generally used to address research questions in scientific and medical research. Academic surveys may also be used to assess the academic environment.

Healthcare surveys are designed to collect information and feedback regarding healthcare, disease prevention and medicines. The collected feedback is used to investigate treatment efficacy and advance the development of new medicines, medical devices and clinical trials.

However, traditional online surveys have drawbacks. Specifically, traditional online surveys include a plurality of standard questions. Some of the standard questions may be irrelevant for a particular participant. As such, the standard questions may cause the user to lose interest in the survey. Additionally, traditional online surveys may include multiple-choice questions which do not allow a user to provide nuanced feedback regarding a particular topic. As such, participants and researchers may fault traditional online surveys as being rigid. Therefore, traditional online surveys often fail to capture the depth and nuance of user's opinions and experiences. Traditional surveys may result in low response rates and superficial research results.

It would be desirable to provide a natural language online survey system. The natural language online survey system may harness generative artificial intelligence ("AI") and machine learning to enhance survey question generation, survey participance and completed survey analysis and research.

It would be desirable for the natural language online survey system to provide a dynamic interactive platform. The dynamic interactive platform may enable a researcher to create a survey using natural language. The dynamic interactive platform may enable a researcher to directly identify survey goals instead of creating a plurality of goal-oriented specific questions.

It would be desirable for the dynamic interactive platform to use generative AI to generate questions to communicate with a survey participant. It would be further desirable for the dynamic interactive platform to leverage the online survey participant's response to a question to generate an adaptive follow-up question. As such, each survey may organically develop its own unique question set. The question and response set may be tailored to the specific survey participant. As such, the dynamic platform may enhance data collection and provide a more comprehensive understanding of a participant's view and opinions.

It would be further desirable for the dynamic interactive platform to enable survey participants to complete a survey using natural language. As such, it would be desirable to enable the survey participant to provide voice responses, text responses or a combination of voice and text responses.

It would be further desirable for the dynamic interactive platform to use the generative AI to combine, summarize and analyze the responses to a specific survey or set of survey responses. It would be yet further desirable for the dynamic interactive platform to enable the researchers to glean insights from the analyzed data. It would be yet further desirable for the dynamic interactive platform to identify the underlying source for each of the provided insights.

SUMMARY OF THE DISCLOSURE

Aspects of the disclosure relate to an artificially intelligent natural language survey system. Such an artificially intelligent natural language survey system may enable a researcher to accomplish research goals by leveraging AI technology. Such an artificially intelligent natural language survey system may enhance the electronic survey experience. Such an artificially intelligent natural language survey system may use speech-to-text techniques to improve the survey process. Such an artificially intelligent natural language survey system may enable a survey taker (also referred to herein as a participant or subject) to take multiple surveys, such as a playlist of surveys, with an increased ease of communication.

Such an artificially intelligent natural language survey system may eliminate a set of fixed, predefined questions. Such an artificially intelligent natural language survey system may allow researchers to develop surveys without the constraints conventionally involved with quantitative surveys. Conventional quantitative surveys may be limited to closed-ended questions, while conventional qualitative surveys may be limited to open-ended questions. Such an artificially intelligent natural language survey system may present qualitative structured (open-ended) questions. However, these qualitative structured (open-ended) questions may produce similar responses as conventional closed-ended questions. As such, the artificially intelligent natural language system may alter the manner in which surveys can be developed.

Such an artificially intelligent natural language survey system may be primarily goal-driven as opposed to question-driven. Such an artificially intelligent natural language survey system may provide a researcher with the ability to reveal information regarding a topic as opposed to confirming already-known information regarding the same topic. Such an artificially intelligent natural language survey system may enable a researcher to control the logic flow using natural language.

In certain embodiments, such an artificially intelligent natural language survey system (i.e., the code stack of the artificially intelligent natural language survey system) may be written using the NET framework. Such an artificially intelligent natural language survey system may use openAI's application programming interface ("API") and large language model ("LLM") to provide artificial intelligence, natural language processing and machine learning to the system. Such an artificially intelligent natural language survey system may be written using Blazor as the front-end. Blazor is a .NET front-end web framework that supports both server-side rendering and client interactivity in a single programming model. Blazor is a framework for building interactive client-side web user interface ("UI") with .NET. C#code may be used to implement various features or functions within the system. C#(C-Sharp) is a programming language developed by Microsoft® that runs on the NET framework. A database, which may store data relating to the natural language system may be written in PostgreSQL®. PostgreSQL is a relational database that supports both SQL (relational) querying and JSON (non-relational) querying.

It should be noted that an unstructured survey is considered to be exploratory. A structured survey may be a traditional online survey. A semi-structured survey, or an exploratory survey with guardrails, may be considered an interview.

Create Survey

The artificially intelligent natural language survey system may enable a researcher to generate a natural language survey. The artificially intelligent natural language survey system may include a graphical user interface. The graphical user interface may enable researchers (also referred to herein as survey creators) to specify goals or themes within the graphical user interface instead of specifying questions. As such, the survey may be a goal-driven survey as opposed to a question-driven survey.

The graphical user interface may also include one or more preset templates. The one or more preset templates may enable the researcher to create a survey. In some embodiments, the survey may be in the form of an interview. The graphical user interface may receive natural language as input. As such, the researcher may instruct the system about the interview using natural language. The artificially intelligent natural language survey system may render/engineer the instructions input by the researcher into prompts/inputs for a large language model ("LLM").

The graphical user interface may also enable the researcher to generate a multiple question survey based on a single natural language prompt. Enabling the researcher to generate a multiple question survey may enable the survey to be constructed substantially entirely by the LLM. As such, a small set of natural language instructions may be used by an LLM to generate a complete multiple question survey.

The graphical user interface may enable the researcher to provide a prompt for the interview/survey. The prompt may be an interview question. The interview question may be an initial question in an interview. The interview question may be presented by the system to each subject. It should be noted that the researcher may not be required to input a prompt/initial question. In the event that an initial question is not input, the LLM may generate a prompt/initial question to present to each subject. In some embodiments, the prompt/initial question generated by the LLM may be the same for each subject. In certain embodiments, the prompt/initial question generated by the LLM may be different for one or more subjects. Selection of the type of initial question may depend on the guardrails (described below) specified by the researcher.

The graphical user interface may also enable the researcher to provide one or more parameters and/or guardrails for the survey. The parameters and/or guardrails may be input into the graphical user interface using natural language. The parameters and/or guardrails may include descriptions, examples, excluded topics, excluded questions and limitations on length. The parameters and/or guardrails may include instructions of how to manage specific responses by topic. The parameters and/or guardrails may include specifying limitations on the initial response provided by the system or follow-up responses provided by the system. Examples of limitations include limitations on topics discussed, information provided, conversational tone, the number of follow-up questions and question structure. At times, no guardrails may be provided. As such, when no guardrails are provided, the system may conduct an interview with a topic or a question stem.

The graphical user interface may also enable the researcher to provide one or more topics, subtopics, context and/or objectives for the survey. The topics, subtopics, context and/or objectives may be input into the graphical user interface using natural language.

The graphical user interface may also enable the researcher to provide specific questions for the survey. The specific questions may include the initial question. The specific questions may be questions after the initial question (i.e., within the body of the survey). The specific questions may include multiple choice questions. Multiple choice questions may be questions that include a selection of one or more predefined answers.

Once the researcher has completed inputting the information and instructions regarding the survey/interview, the artificially intelligent natural language survey system may generate prompts/inputs for an LLM. The LLM may process the prompts/inputs and generate the interview. It should be noted that the interview may be administered to a plurality of subjects. As such, a unique copy of the interview may be generated for each subject.

Processing the information and instructions into prompts may include various technological insertions and modifications. It should be noted that the prompts for input into the LLM may be written in natural language. However, certain functions of the prompts may be written using computer code. For example, processing the information and instructions may include instructing the LLM to end the interview when appropriate if three instances of the system providing a question and the subject providing a response have transpired. Three instances of the system providing a question and the subject providing a response may be a threshold level of depth. Instructing the LLM to end the interview may include calling an end interview function. Calling the end interview function may be written in C#computer language. Other features such as the instructions to proceed to another prompt as well as function calling features may also be written in C#.

Natural language may be used to instruct processing of survey information. Processing of survey information may include instructing the system to extend the interview (and/or each survey question) more than three instances (or any other suitable number of instances) of questions and responses.

At times, a single question or instruction from the survey creator may result in multiple questions generated by the LLM. As such, processing the information may include instructing the system to extend the interview (and/or each survey question) more than three instances (or any other suitable number of instances) of the system providing a question and the subject providing a response.

It should be noted that when a subject provides terse responses to questions, the system may conduct an interview that is longer than a predetermined threshold length of time; when a subject provides long responses to questions, the system may conduct an interview that is less than a predetermined threshold number of questions. The inverse relationship between threshold length of time and length of subject response may be because longer responses include more information than shorter responses and therefore require less questions.

Processing the inputs may include designing the survey to include conditional logic. For example, the system may call an end follow-up function when the response to the question has been identified and/or a predetermined number of questions have been presented by the system and responded to by the user. Questions provided by the system may include open-ended questions and closed-ended questions. Open-ended questions enable a subject to elaborate on a response. An open-ended question may not limit the subject to answer by selecting a limited set of selectable responses. Processing the inputs may include designing the survey to continue to present additional questions (probe) for additional information from the subject. The system may determine that the open-ended question has been responded to either once the system received sufficient information regarding the question or a predetermined number of questions have been responded to by the user regarding the question.

A closed-ended question may limit the subject to answer by selecting a limited set of selectable responses. Such a closed-ended question may be a multiple-choice question. The multiple-choice question may have a selectable number of answers. The multiple-choice question may be a question that receives a yes or no response.

The conditional logic may instruct the LLM to follow-up on certain selected responses to a closed ended question. For example, if a closed-ended question stated Did you eat breakfast? a response of no may instruct the system to call the end follow-up function. However, a response of yes may instruct the system to create one or more follow-up questions, such as What did you eat for breakfast?

The LLM may provide a java script object notation ("JSON") for creating functions. As such, any computer language can be used to create functions. The JSON structure may ensure that the functions match a certain structure.

The system may use voice, text or any other suitable input/output format to communicate with a survey creator to enable the survey creator to create a survey. Additionally, the system may use voice, text or any other suitable input/output format to communicate with a survey taker to enable the survey taker to take a survey. As such, multiple-choice questions may be responded to via free text/speech. The system may semantically map the input free text/speech to a selection from the selectable choices using a best-fit analysis to assign the response to a prespecified category. The system may identify from the free text/speech input by the survey taker what selection was selected. As such, a closed-ended question may be answered using a spoken natural language approach.

The graphical user interface may enable the survey creator to control the survey length. The survey length may be controlled by specifying a number of follow-up questions or using natural language to limit the scope of follow-up. The survey length may be controlled by specifying a time limit or a time limit range (for example, not more than 20 minutes, anytime between 10 and 20 minutes or at least 5 minutes). The boundaries can be applied by specifying a maximum number of follow-up questions or via natural language using terminology such as briefly. The system may also be instructed to extensively explore a topic. As such, the system may collect more data through more intensive questioning of the defined topic.

The LLM may be assigned a portion of working memory. The working memory may be used to maintain information regarding the survey. The working memory is used to augment follow-up questions. Questions provided by the LLM consider the previous responses provided by the respondent. Therefore, such a system may be able to extract information regarding a topic that was heretofore not considered by the researcher. Furthermore, the memory does not carry over from survey to survey; the memory is individual for each survey taker. As such, each survey participant is assigned its own working memory location. It should be noted that assigning a clean memory location for each survey taker removes biases within the survey.

Additionally, at times, demographic information relating to the participant may be piped into the working memory of the LLM. As such, the LLM may use the piped-in knowledge regarding the participant to ask appropriate questions. Additionally, the piped-in knowledge may remove the responsibility from the LLM to ask the participant demographic questions, which may waste computing resources and participant time and attention.

Once the researcher provides information into the graphical user interface (whether via a template or via free-form communication), the researcher may indicate that the provided information is complete. The artificially intelligent natural language survey system may use the information to generate and design a survey. The system may provide, using the graphical user interface, an editable version of the survey to the survey creator. The survey creator may edit the editable version of the survey based on one or more specifications. Upon editing the survey, the researcher may indicate that the survey is complete. Upon receipt of such an indication, the artificially intelligent natural language survey system may package the survey and transmit the survey to one or more subjects.

Additionally, during creation of the survey, the system may provide, using the graphical user interface, an editable version of each survey question to the survey creator. The editable version of the survey question may enable the survey creator to interact with the question and appreciate how the question performs in a survey. The survey creator may be able to edit, and otherwise interact with the question pending the survey creator's full satisfaction with the quality of the question performance.

Administer Survey

The artificially intelligent natural language survey system may present the survey to one or more subjects. The system may preferably be scalable to any number of subjects. The presentation may be via a graphical user interface. The presentation may be via a telephone conversation. The presentation may be via an audio interface on a smart device, such as smartphone. The one or more subjects may be selected based on one or more predetermined criteria.

The artificially intelligent natural language survey system may communicate with the subject. The system may use audio/voice communication to communicate with the subject. The system may maintain an on-topic conversation with the subject while adhering to any guidelines and/or parameters provided in the instructions. The guidelines may include one or more guidelines discussed earlier. The system may convert a natural language survey into a conversation.

The system may recall earlier portions of the survey and/or question stream and may provide coherent probing questions to obtain further information on the topic.

As such, the system may be understood to refer to a conversational artificial intelligence survey tool that performs voice-based, or other suitable, interviewing.

The system may be able to identify when a subject has stopped responding to a question. The system may then provide a follow-up AI-driven response. The responses may be fed back into the system and stored in the working memory specific to the subject. The stored responses (specific to the individual) may be used to augment the following question. As such, the memory may alter the direction of future questions. It should be noted that the memory may enable recall within a single survey. There may preferably be no recall from survey to survey.

Less information (specific questions) may be provided by the researcher than the amount of information provided in a typical survey. As such, a system according to the embodiments may help to remove bias by giving as little external direction to a participant as possible and eliciting a larger and more diverse amount of information.

During the interview, follow-up questions are substantially reactive to participant responses and cannot be predicted in advance. However, the follow-up questions may adhere to the guidelines and parameters specified by the survey creator.

Process Survey and Generate Reports

The artificially intelligent natural language survey system may aggregate the surveys provided to the one or more subjects. The system may process the aggregated surveys into a plurality of data elements, perform analysis on the plurality of data elements and output the analysis. The analysis may be output and presented on one or more graphical displays.

There may be various output types. The output types may include LLM-extracted themes. The LLM-extracted themes may be regarding a research topic, a study objective and/or a study context. The output types may include researcher-defined themes. The LLM may examine the plurality of data elements for information on the researcher-defined themes.

The system may extract major themes from the plurality of data elements. The themes may be measured based on how strongly the responses are expressed. The themes may be extracted and/or mined from the plurality of data elements in different ways.

The system may extract insights from the plurality of data elements. There may be a plurality of insight types. A first insight type may be an AI-generated insight (also referred to as an unguided insight). A second insight type may be a researcher guided insight. A researcher guided insight may be specified by the researcher, extracted via the AI and/or metricized.

The system may present a graphical user interface which may enable a researcher to define an insight, topic and/or theme, for the system to measure using a researcher-defined range. For example, the researcher may instruct the system (using natural language) to rank customer satisfaction for a specific service on an exemplary scale of 1 to 10. It should be noted that such a system may combine qualitative research with quantitative research. The AI may be able to quantify results that were researched using qualitative methods. The system may present the results of the insight, topic and/or theme to the user using one or more user interfaces, such as graphical user interface, voice/audio interfaces or any other suitable interfaces.

In order for the system to provide AI-generated insights, the plurality of data elements may be fed into the LLM using a first approach. This may be because an LLM may not be able to capture nuances from a large amount of data. When an LLM is fed a large amount of data, the LLM may blur the data into an obvious set of themes or the LLM may fail to process the data. Therefore, the system may implement a grounded theory approach to consider the plurality of transcripts of completed surveys within the plurality of data elements. As such, one transcript at a time may be provided to the LLM. The LLM may analyze the first transcript and extract one or more themes and/or tags. Each theme may be extracted and added to a running list of themes. The LLM may sequentially process the following transcript. The LLM may view the following transcript with the ability to add themes and/or apply themes. Quotes may be retrieved during the processing of the entirety of the transcripts. Additionally, the LLM may perform an analysis to determine a relevancy metric for each of the themes and/or a prominence metric for each of the themes. The LLM may present the themes, the retrieved quotes and a prominence score for each of the themes to the user. The prominence metric may be ranked on a scale, such as a scale from 0-5.

In some embodiments, the system may review all of the transcripts through the lens of the extracted themes. This may overcome the challenge that when a specified theme occurs in a transcript within the plurality of transcripts, any prior transcripts may not have been reviewed with the lens of the identified theme.

The system may enable a researcher to select a theme and/or specify a research theme. The system may then process (view) the plurality of transcripts using the lens of the identified theme(s). Processing the plurality of transcripts using the lens of the identified theme(s) may be referred to as a second approach. The output of the process identified by the second approach may differ from the output of the process identified by the first approach because the system may review the transcripts sequentially while looking for a specific theme. The system may produce a graphical output that specifies each determined theme, its prominence score and/or a brief definition (in natural language) of the topic.

These themes may be linked to subject-level data (such as quotes provided by subjects). The subject-level data may be selected to explain why the AI assigned the theme to subject's response. This cross-linked data analysis (link between quotes and themes) recreates a qualitative analysis without requiring the input of a researcher. The system may be able to perform qualitative analysis on the group of survey transcripts. The system may be able to link quotes to themes.

A prominence score may be a relative metric for how often a theme, insight or topic appears within the data set. The prominence metric, which may be a assigned a value on a scale (such as, for example, a scale of 0 to 5) for ranking derived themes based on frequency, length and/or intensity of quotes from individual subjects.

Researchers may define 'tags' for the data. Tags may be potential optional responses to an open-ended question. Researcher-defined tags may be assigned a prominence score based on frequency of responses that fit into the defined categories. Researchers may define potential options for responses that the system can measure using the prominence score. For example, the system may determine a percentage of each of a collection of methods in which a subject heard about a specific product. The question may include: Which methods did you use to hear about the product, website, print-ad or through a friend?

The system may be able to quantify results of a group of survey transcripts. For example, the system may be able to indicate a level of depression of each survey participant even in a survey where specific questions regarding depression have not been included in the survey. As such, the system may receive qualitative data and quantify the data.

Each of the tags, themes and/or ranges may be sourced to one or more particular survey respondents and/or quotes from the survey respondent. The system may enable a user to select a specific sourced quote.

The system may display an AI-generated summary of a selected survey respondent. The system may also display a word for word transcript of a selected survey respondent.

An AI-driven subject summary may be provided. The summary may include an overall engagement score and/or applicability of responses to question stems. The summary may also summarize key points as impacts theme-based survey design. The system produces a brief summary report for each subject specifying their engagement in the AI-driven interview, depth of the AI-driven interview and/or appropriateness of responses provided by the subject. The appropriateness of responses may be identified by comparing each response to the predefined themes. The brief summary report may also summarize the top-level responses. Additionally, the system may enable the subject to click into the summary report and obtain the transcript of the interview itself.

Additional Features

Moderator AI

The artificially intelligent natural language survey system may include a supervisor AI. The supervisor AI may supervise an in-process survey. The supervisor AI may flag data based on a set of instructions (prompts).

The supervision may ensure that questions asked by the system are true to the goals indicated by the researcher. The supervisor AI may ensure quality of the in-process survey. The supervisor AI may ensure that leading questions are applicable. The supervisor AI may monitor for toxicity, such as unhealthy or inappropriate behavior issues on the part of the system or on the part of the researcher. Unhealthy behavior issues may include use of the same word multiple times, repetitive behavior or any other suitable unhealthy behavior issues. Toxicity may be identified by one or more words, previously labeled as toxic, included within the communication. The supervisor AI may monitor for non-sequitur questions from the system and non-sequitur responses from the subject. The supervisor AI may monitor for hallucinations generated by the system.

The supervisor AI may identify, log and/or flag instances of toxicity issues. The supervisor AI may flag cases recognized as having AI-induced toxicity issues or remove instances of unhealthy issues from the analysis so the quality of the analysis will not be damaged. The supervisor AI may output a log of unhealthy issues. The log of unhealthy issues may be provided to the researcher for analysis.

The supervisor AI may monitor the in-process survey using screen recordings, text recordings and/or audio recordings.

The system may enable a researcher to provide a set of customized instructions to the supervisor AI. As such, the supervisor AI may focus on one or more specific issues that the researcher is concerned with for the study.

The system may store the data identified by the supervisor AI as unhealthy or problematic. The system may use the stored data as training material to learn to handle such scenarios in a healthy manner in a future instance.

The supervisor AI may also detect AI-generated responses and anomalies. The supervisor AI may detect that one or more responses provided by the respondent have been generated by an artificially intelligent processor. The detection may include identifying that one or more responses may score less than a predetermined threshold level of being human-generated.

The supervisor AI may also detect that one or more responses provided by the respondent are anomalous responses. The anomalous responses may indicate participant dishonesty, participant attentiveness below a predetermined threshold and/or any other indicators/markers that the data quality provided by the participant may be rated lower than a threshold of data quality.

The supervisor AI may utilize one or more detection components to identify a response as being generated by an artificially intelligent processor or an anomalous response. The supervisor AI may utilize one or more intervention protocols to remediate the survey session identified as either involving an artificially intelligent processor to produce responses or providing anomalous responses.

The detection components may include an AI response likelihood assessment. As such, the AI supervisor may utilize advanced machine learning algorithms to analyze response patterns and linguistic cues, from a participant, that categorize AI-generated text. When a response exceeds a predetermined threshold of being AI-generated text, the AI response likelihood assessment may flag the response for remediation.

The detection components may include an anomaly detection. The AI supervisor may continuously monitor a survey session for inconsistencies and/or irregularities in the participant responses that deviate, over a threshold, from expected human behavior patterns. Such inconsistencies and/or irregularities may include rapid response times, repetitive phrasing, unusually complex sentence structures or deviation, over a threshold, from the respondent's previous responses.

The intervention protocols may include provide Completely Automated Public Turing test to tell Computers and Humans Apart ("CAPTCHA")-like challenges. Upon detection of a potential AI-generated response or significant anomalies, the supervisor may initiate, or instruct initiation of, interaction challenges similar to CAPTCHA. Such challenges may be designed to be easily solvable by humans but difficult for an AI. Such challenges may include identifying objects in images, interpreting distorted text or solving simple real-world problems.

The intervention protocols may also include human verification interaction. When responses from a particular participant continue to trigger flags after CAPTCHA-like challenges, or if the anomalies suggest a sophisticated AI mimicking one or more human responses, the system may escalate the survey session to a human operator for verification. Such a protocol may involve a human moderator who may assess the situation through additional questioning or dialogue to confirm identity/authenticity of the respondent.

It should be noted that the detection components may be customizable. As such, researchers may customize the sensitivity of the detection algorithms and the thresholds for triggering intervention protocols based on the researcher's study usage. The AI supervisor may provide a researcher with flexibility in balancing respondent convenience with data quality. Additionally, the interventions may be designed to respect respondent privacy and comply with ethical standards. As such, the interventions may be minimally invasive and justified by substantial evidence (greater than a threshold of evidence) of potential data quality issues.

Such detection components and intervention protocols may enable higher reliability level of survey data by reducing the risk of compromised results because of AI interference or respondent anomalies/dishonesty. Such detection components and intervention protocols may also provide a proactive approach that enables a survey system to adapt to emerging threats and challenges in real-time, while maintaining the integrity of the data collection process across diverse respondent pools and evolving technology landscapes.

AI Prespecified Personalities

The system may include a plurality of AI-developed subjects. The AI-developed subjects may take sample surveys to test the functionality of a survey.

These subjects may be pre-built to have a specific set of demographics and personalities that can be used to test elements of the natural language survey. The personalities may be designed to represent standard subjects and/or difficult subjects. Standard subjects may provide expected answers to question stems. Difficult subjects may purposely give challenging or incorrect answers to question stems.

The system may enable a researcher to create an AI subject. The researcher may use natural language to describe user archetypes. The created AI subject(s) can then take the survey to deliver test results. The test results may be reviewable by the researcher. The researcher may be able modify the survey based on the delivered test results.

The AI developed subjects may stress-test surveys prior to exposure to live subjects. The AI developed subjects may be used to test elements of the natural language survey.

Engagement Score Subsystem

The artificially intelligent natural language survey system may include an engagement score subsystem. The engagement score subsystem may continuously monitor participant engagement. The engagement score subsystem may assign an engagement score to participant engagement. The engagement score may be continuously changing. The engagement score may be continuously changing based on the monitoring.

The engagement score may be presented graphically. The engagement score may be displayed to the participant. The engagement score may be hidden from the participant. The engagement score may be displayed to the researcher.

In some embodiments, an indicator, such as a status bar, which identifies the engagement score may be displayed to the participant. The status bar may use a color-coded display to quantify user engagement. The color-coded display may display, for example, green, yellow or red, or other suitable colors, to quantify user engagement.

The engagement score subsystem may continuously monitor participant engagement by identifying and combining one or more of: physical actions, such as mouse movement and copy and paste activation detection, response salience/accuracy metrics and/or reaction time (time to respond after a question stem has been delivered) to create a continuously changing metric of engagement.

The engagement score subsystem can be used to remove participants from a survey if the engagement score falls below a predetermined threshold of appropriateness/involvement. The engagement score may be used to withhold renumeration from a survey participant.

The engagement score subsystem may tag each subject response with an AI-determined appropriateness score that rates a fit between the subject's response and the question.

Test Harness

The test harness may provide a set of tools to measure the quality of various aspects of the system. For each task or subtask that the system performs, such as conducting an interview or responding to a specific message, several AI prompts may be executed. Using the test harness, the outputs of each of these individual prompts, as well as the combination of the outputs of the prompts working together, can be measured alongside a set of expected data. The measurement may be provided to the system. The system may use the measurement to test and improve upon prompt engineering throughout the system. As AI is non-deterministic, traditional methodologies that rely on matching expected with actual outputs cannot be used. Instead, the system uses a suite of many test cases for each prompt or feature. A configurable pass-rate percentage may be used to determine overall acceptability.

The test harness may process each response included in a set of system-graded responses from live participants using the engagement score subsystem. The outputs of the processing of each response may be compared to the expected outputs with a researcher-customizable, configurable and/or predefined margin of error (e.g., +/−15 points out of 100). When more than a plurality of test cases in this suite score above the margin of error, the test suite may be identified as failed.

Certain test case inputs may not be identified in advance and may use AI-generated test data, i.e., simulated responses. For example, to test prompt engineering of an interview question type, a conversation between the system and a participant may be dynamically created using an interview question prompt as an input. The participant responses may be generated using AI. The participant responses may leverage simulated responses with simulated personalities. The AI-generated conversation may be used as a complete test case input.

A dynamically-generated interview question may not be assigned an actual overall quality score in advance of the test running. After the conversation has been generated, the test harness may use artificial intelligence to measure the overall quality of the interview. The AI-generated test output may be compared to a provided "expected" quality score range. The test may pass or fail, depending on whether the interview question generates a conversation of sufficient quality.

Because both the survey generation and survey responses may be tailored to a specific participant, such a dynamic interactive platform may provide high-level research that combines strength of qualitative and quantitative research. Therefore, the natural language system may overcome the drawbacks of traditional online surveys.

Use Cases

Depression survey score for a student abandoning a college course of study.

Work-life balance for human resource surveys.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 9 shows yet another illustrative diagram in accordance with principles of the disclosure;

FIG. 11 shows yet another illustrative diagram in accordance with principles of the disclosure;

FIG. 13 shows yet another illustrative diagram in accordance with principles of the disclosure;

FIG. 14 shows still another illustrative diagram in accordance with principles of the disclosure;

FIG. 15 shows yet another illustrative diagram in accordance with principles of the disclosure;

FIG. 17 shows yet another illustrative diagram in accordance with principles of the disclosure;

FIG. 18 shows still another illustrative diagram in accordance with principles of the disclosure; and FIG. 19 shows yet another illustrative diagram in accordance with principles of the disclosure.

DETAILED DESCRIPTION OF THE DISCLOSURE

Figure 1:
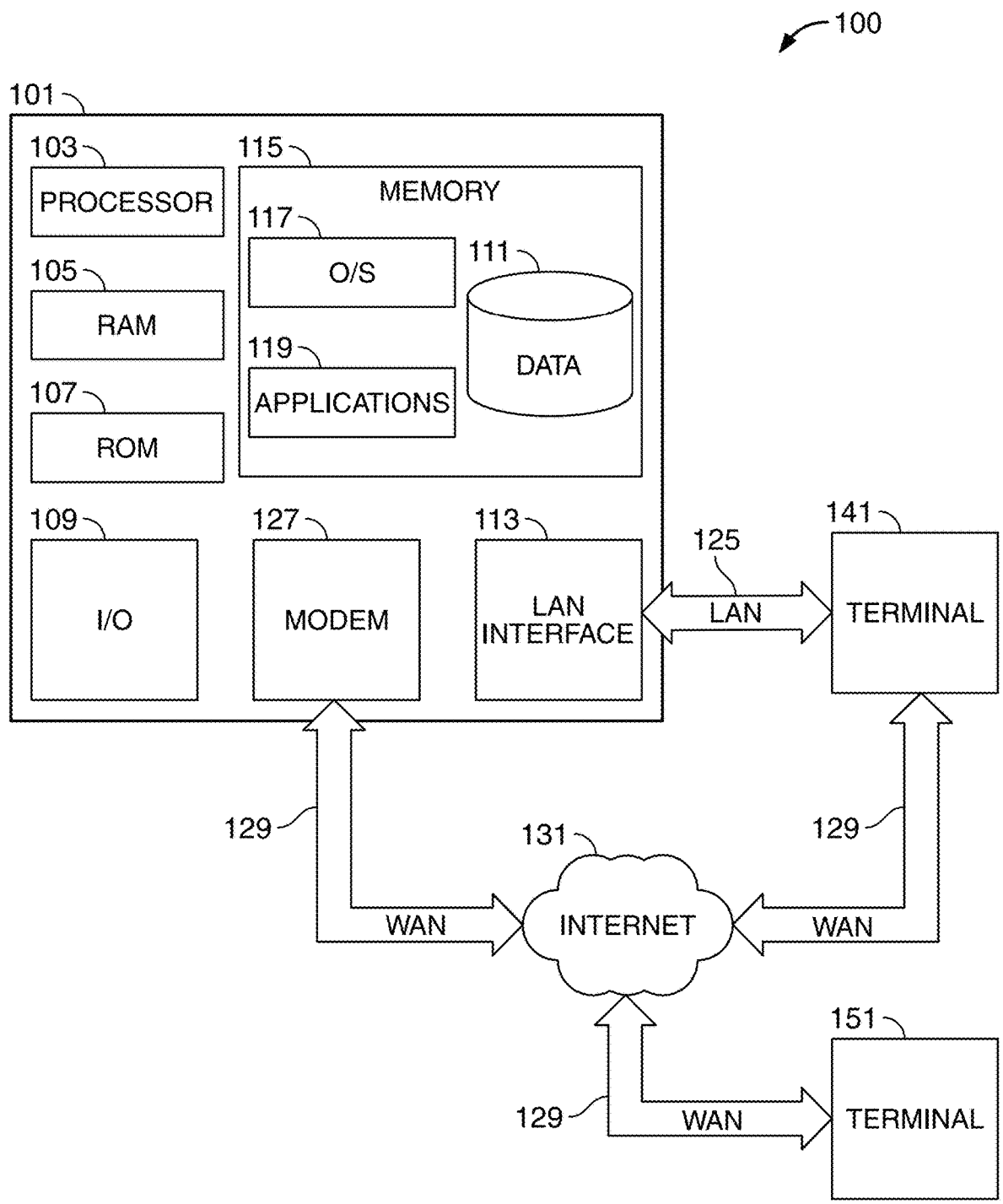
FIG. 1 shows an illustrative diagram in accordance with principles of the disclosure.

A method for administering a survey using an artificial intelligence engine is provided. The artificial intelligence may include and/or be powered by an LLM.

The method may include using a natural language interface to generate a survey using natural language. The method may include using the natural language interface to create a set of guardrails for the survey using natural language.

The method may include administering the survey to a plurality of survey takers. The administering may include presenting a first question to a survey taker. The first question may be generated by the artificial intelligence engine. The first question may be generated and/or received from a researcher using the natural language interface. The presenting may be via a user interface. The presenting may be via one or more modes, such as voice, text and/or audio. The administering may include receiving a first natural language response from the survey taker. The receiving may be via one or more modes, such as voice, text and/or audio.

The administering may include generating a subsequent question. The subsequent question may be responsive to the first natural language response and constrained by the set of guardrails. The administering may include presenting the subsequent question to the survey taker. The presenting may be via a graphical user interface or other suitable display. The administering may include receiving a subsequent natural language response from the survey taker.

The administering may include generating a follow-up question. The follow-up question may be responsive to the subsequent natural language response and constrained by the set of guardrails.

The administering may include closing the survey for the survey taker.

The first natural language question and/or the subsequent natural language question may be a multiple-choice question. The multiple-choice question may be answerable via an open-ended, voice-delivered answer.

During administering the survey to the plurality of survey takers, the method may include identifying, in real-time, a continuously updating engagement score. The engagement score may measure the extent to which the survey taker is engaged in the survey. For example, survey takers giving the survey a predetermined amount of attention, or higher, may be assigned a high engagement score, while survey takers that are distracted and are giving the survey less than a predetermined amount of attention may be assigned a relatively lower engagement score.

The survey may be closed for the survey taker upon the indication of one or more triggers. The one or more triggers may include identifying less than a predetermined amount of engagement from the survey taker. The one or more triggers may include receiving a threshold amount of data from the survey taker.

The method may include extracting a plurality of data elements from the survey administered to the plurality of survey takers. The methods may include generating a report comprising organized information extracted from the plurality of data elements.

The method may include identifying and labeling one or more questions from the first question and subsequent questions that score above a predetermined threshold of toxicity. The predetermined threshold of toxicity may be identified by a communication that includes a number of words that have been previously labeled as toxic. The method may include identifying and labeling one or more responses from the first natural language response and subsequent natural language responses from a participant that score above the predetermined threshold of toxicity. The method may include flagging the labeled questions and responses and labeled communications. Flagging may include placing a metadata tag on the questions and responses. The method may include flagging the one or more surveys that includes the labeled communications. The method may include removing the flagged survey from the plurality of data elements and from the report.

The method may include testing the accuracy of responsiveness and quality of a large language model powering the artificial intelligence engine. The testing may be comparing the quality of survey results obtained using a first large language model to the quality of survey results obtained using a second large language model.

A system for generating a natural language, AI powered, survey may be provided. The system may include a processor. The processor may operate in tandem with a large language model.

The system may include a graphical user interface ("GUI"). The GUI may be operable to receive natural language input. The natural language input may relate to one or more survey goals, a selection of one or more survey templates, a set of guardrails and/or an initial question. The set of guardrails may include descriptions, examples, excluded topics, excluded questions and/or length limitations.

The processor may be operable to translate the natural language input into a plurality of unstructured survey parameters. The processor may be operable to translate the natural language input into a plurality of unstructured survey parameters. The processor may be operable to generate an editable version of the survey and/or an editable version of each question within the survey. The processor may be operable to receive input relating to one or more modifications of the survey and/or a question within the survey. The processor may be operable to receive input relating to the completion of the survey. The processor may be operable to convert the natural language input into a conversational survey using the parameters. The processor may be operable to, upon receiving input relating to the completion of the survey, render the natural language input prompts for use with the large language model.

The system may also include a test harness. The test harness may operate on the processor and/or on a second processor. The test harness may compare the quality of survey results using a first large language model to the quality of survey results using a second large language model.

An artificially intelligent system for administering a natural language survey may be provided. The system may include a processor. The processor may operate in tandem with a large language model.

The system may include an interface. The interface may be operable to, for a plurality of participants, perform the following executables. The executables may include assigning a memory segment for the participant. The executables may include communicating with each participant by conducting a conversational survey between the processor and the participant. The executables may include presenting a first question to the participant. The first question may be generated by the processor. The first question may be input by a researcher. The executables may include receiving a first natural language response from the participant. The executables may include storing the first natural language response in the memory segment.

The executables may include generating a subsequent question. The subsequent question may be based at least in part on information stored within the memory segment and constrained by a set of guardrails. The memory segment may be unique or distinct for each participant. The executables may include presenting the subsequent question to the participant. The executables may include receiving a subsequent natural language response from the participant.

The interface may be operable to, in real-time, for each of the plurality of participants, identify a continuously updating engagement score. The engagement score may measure the extent to which the participant is engaged in the survey.

The processor may be operable to, upon indication of one or more triggers, close the survey for the participant. The one or more triggers may include calling an end survey function.

The system may include an artificially intelligent moderator. The artificially intelligent moderator may operate on the processor and/or on a second processor. The second processor may be distinct from the processor.

The artificially intelligent moderator may be operable to identify and/or label questions from the artificially intelligent system that score above a predetermined threshold of toxicity. The artificially intelligent moderator may be operable to identify and/or label natural language responses, from a participant, which score above the predetermined threshold of toxicity. The artificially intelligent moderator may be operable to flag the labeled questions and responses as labeled communications. The artificially intelligent moderator may be operable to remediate the survey that includes the labeled communication by initiating a second question from the artificially intelligent system. The artificially intelligent moderator may be operable to identify whether communication sequential to the second question score above the predetermined threshold level of toxicity. When the communications sequential to the second question score above the predetermined threshold of toxicity, the artificially intelligent moderator may be operable to flag the survey that includes the second question as toxic, end the flagged survey and/or remove the survey from the one or more study results.

In some embodiments, the artificially intelligent moderator may identify and label questions from the artificially intelligent system that score above a predetermined threshold of toxicity. The artificially intelligent moderator may flag the survey that includes the labeled questions as toxic. The artificially intelligent moderator may remove the survey from one or more study results.

The system may include a set of artificially intelligent prespecified personalities. The set of artificially intelligent prespecified personalities may operate as one or more test survey takers and take the survey prior to the plurality of participants. The researcher may view the results of the test surveys to further refine the survey prior to the exposure to live participants.

The system may include a test harness. The test harness may be used to maintain the quality of the system. As such, the test harness may be used to compare the quality of the survey results using a first large language model to the quality of the survey results using a second large language model.

A system for processing results of a natural language survey may be provided. The system may include a memory. The memory may be operable to receive a plurality of recordings. The recordings may relate to conversational surveys between a survey participant and a natural language survey system.

The system may include a processor. The processor may operate with a large language model. The processor may convert the plurality of conversational surveys into a plurality of transcripts. The conversion may be executed using one or more speech-to-text conversion systems.

The system may use artificial intelligence to process the plurality of transcripts sequentially by operating one or more of the following actions. The actions may include extracting one or more themes from a first transcript within the plurality of transcripts. The actions may include adding the one or more themes to a running list of themes. The actions may include processing a transcript following the first transcript with the ability to add additional themes to the running list of themes and/or apply themes included in the running list of themes. The actions may include retrieving quotes from the plurality of transcripts that relate to themes included in the running list of themes.

The system may include an interface. The interface may be operable to present an analysis of the plurality of transcripts. The analysis may include the running list of themes and one or more of the retrieved quotes associated with the themes.

The processor may be operable to receive a theme in natural language. The processor may be operable to use artificial intelligence to process the plurality of transcripts sequentially by executing one or more of the following actions. The actions may include analyzing the theme as applied to each transcript included within the plurality of transcripts. The actions may include retrieving quotes from the plurality of transcripts that relate to themes included in the running list of themes. The interface may be operable to present an analysis of the plurality of transcripts. The analysis may include the theme and one or more of the retrieved quotes associated with the theme.

Each response of each survey participant may be tagged with a cumulative engagement score. The engagement score may measure the extent, up and including the tagged response, that the survey participant engaged in the conversational survey.

Each conversational survey may be tagged with an engagement score. The engagement score may measure the extent that the survey participant engaged in the conversational survey.

The system may include a test harness. The test harness may be operable to compare the quality of the survey results using a first large language model to the quality of survey results using a second large language model.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions may be embodied in hardware or firmware (not shown). The computer 101 may execute the instructions embodied by the software to perform various functions.

Input/output ("I/O") module may include connectivity to a microphone, keyboard, touch screen, mouse, camera, and/or stylus through which a user of computer 101 may provide input. The input may include input relating to cursor movement. The input may be participant input. The participant input may be responsive to a survey, another suitable prompt, or, in some embodiments, self-initiated input. The input may also include input by an administrator via a UI. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, cloud-based memory, or any other suitable memory. Any of various conventional web browsers can be used to display and manipulate retrieved data on web pages.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to assessing and/or maintaining the quality, validity, and/or accuracy of participant input.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
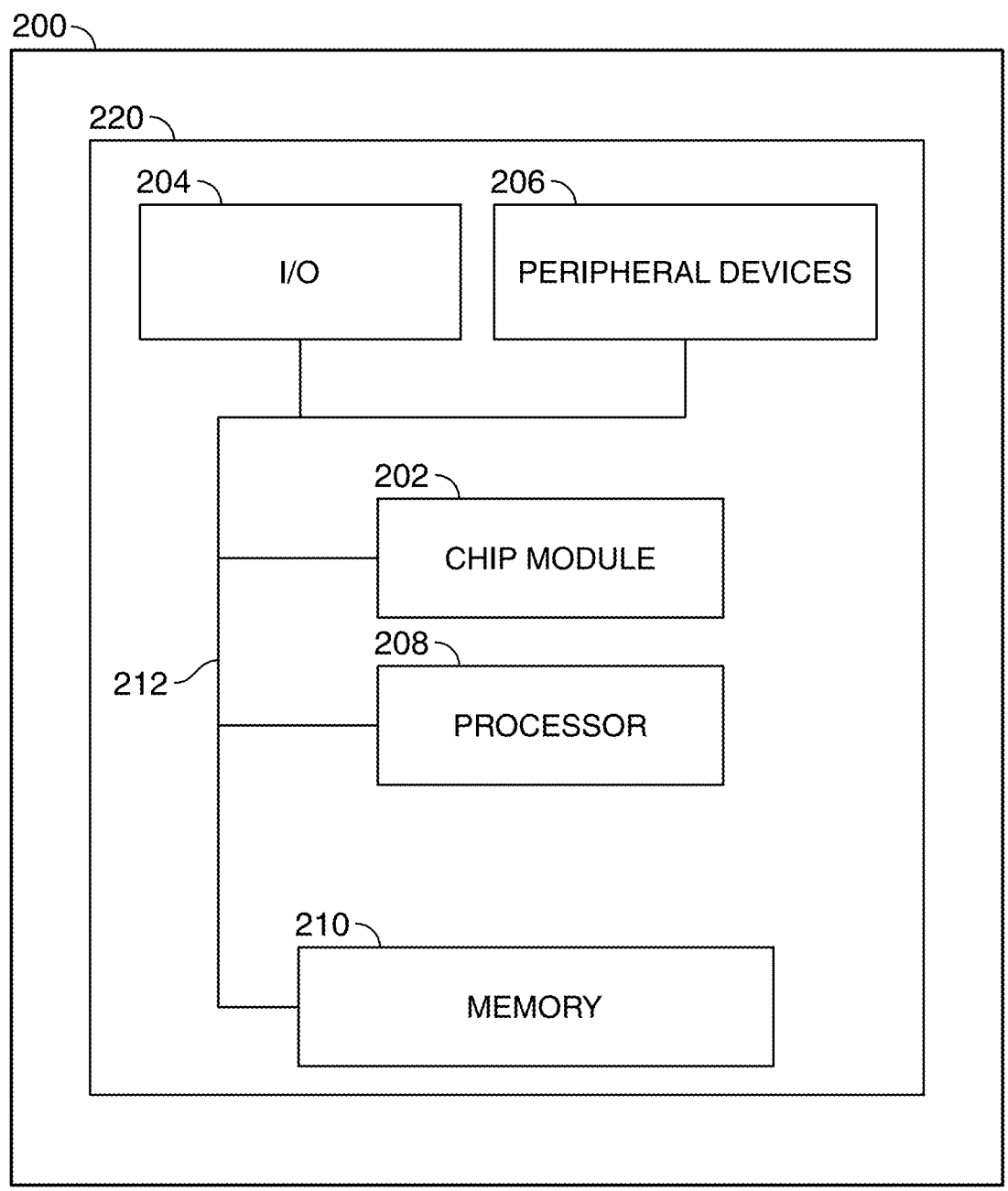
FIG. 2 shows another illustrative diagram in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
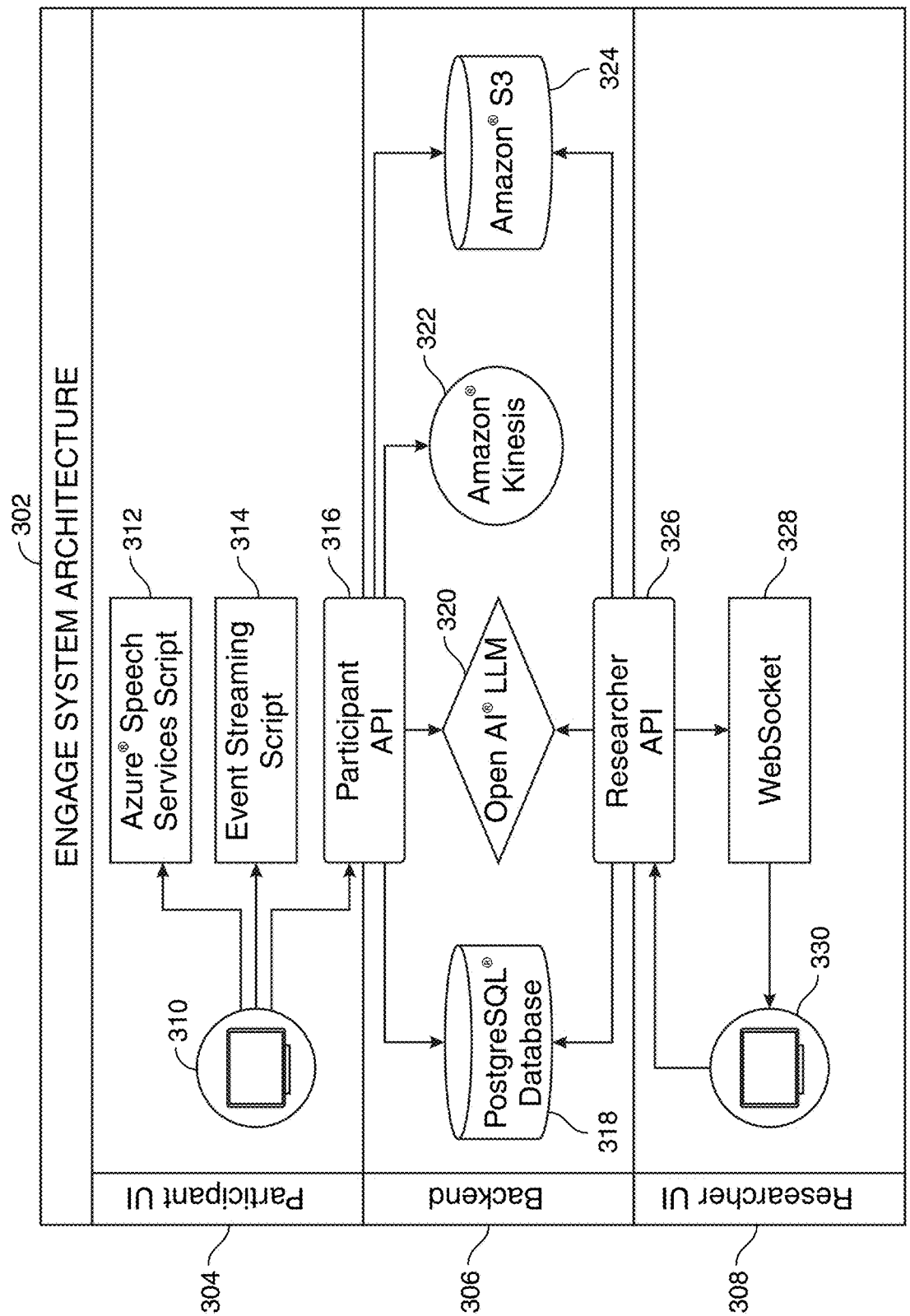
FIG. 3 shows yet another illustrative diagram in accordance with principles of the disclosure.
Figure 4A:
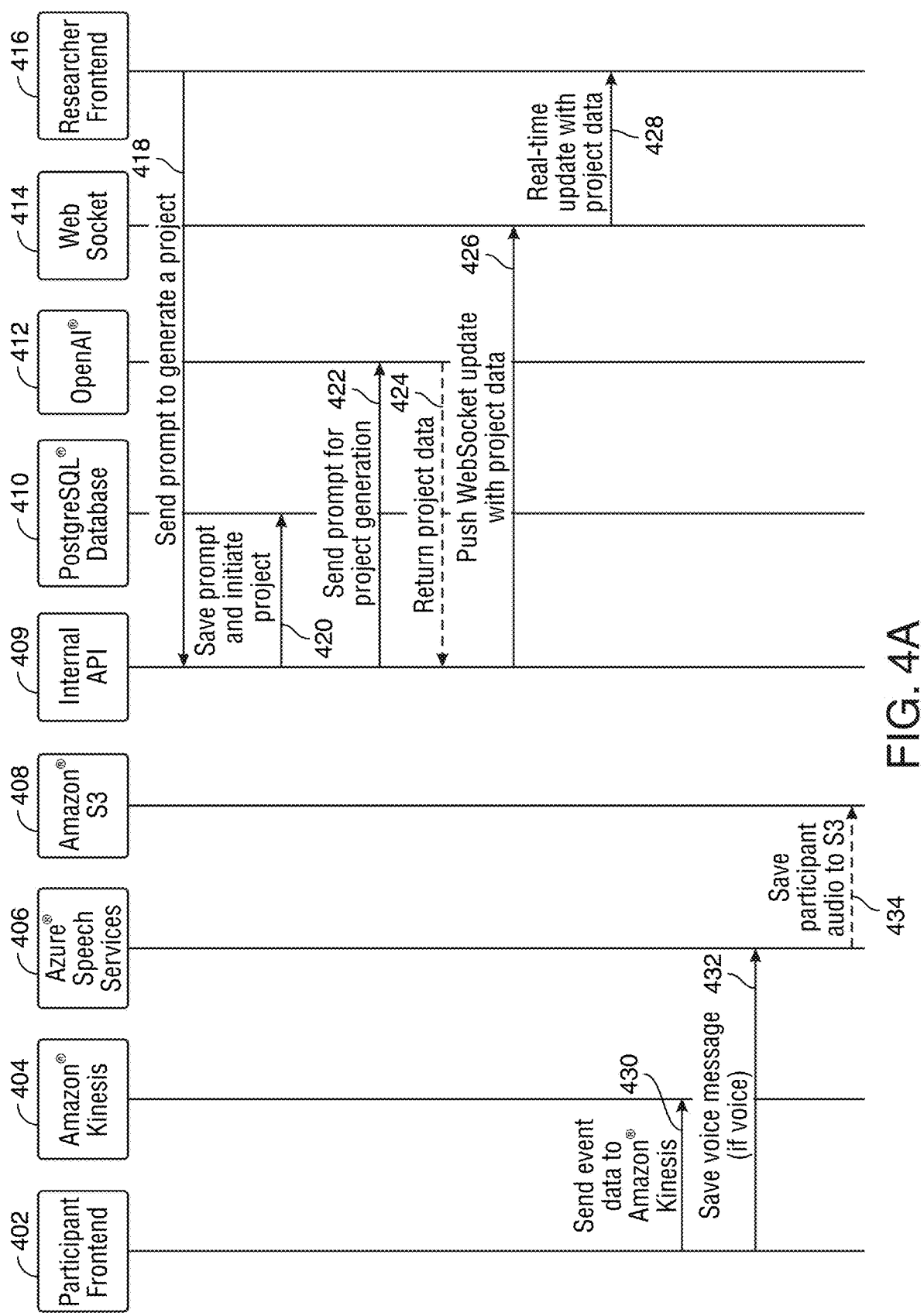
FIGS. 4A, 4B, 4C and 4D show still another illustrative diagram in accordance with principles of the disclosure.
Figure 4B:
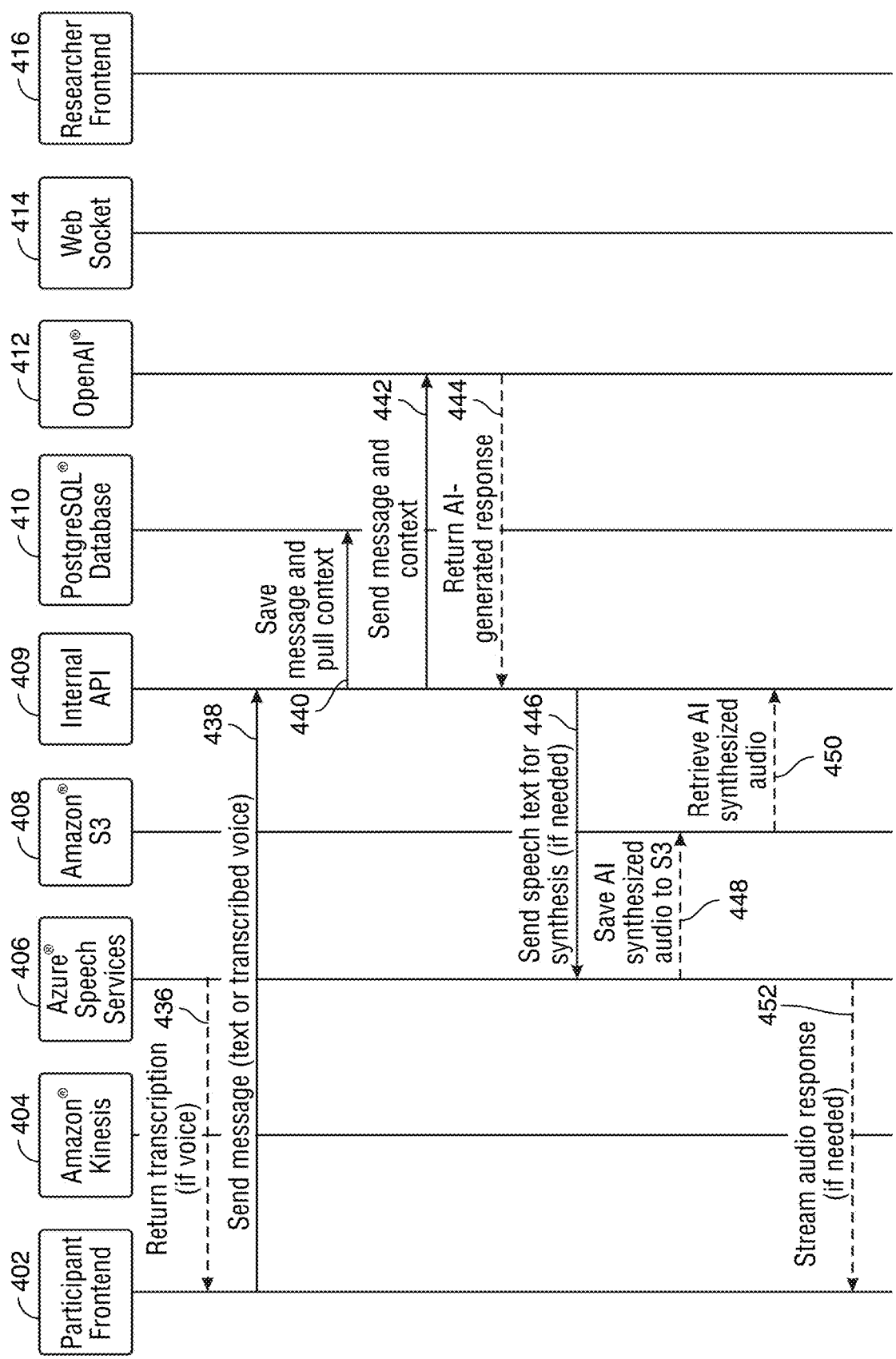
Figure 4C:
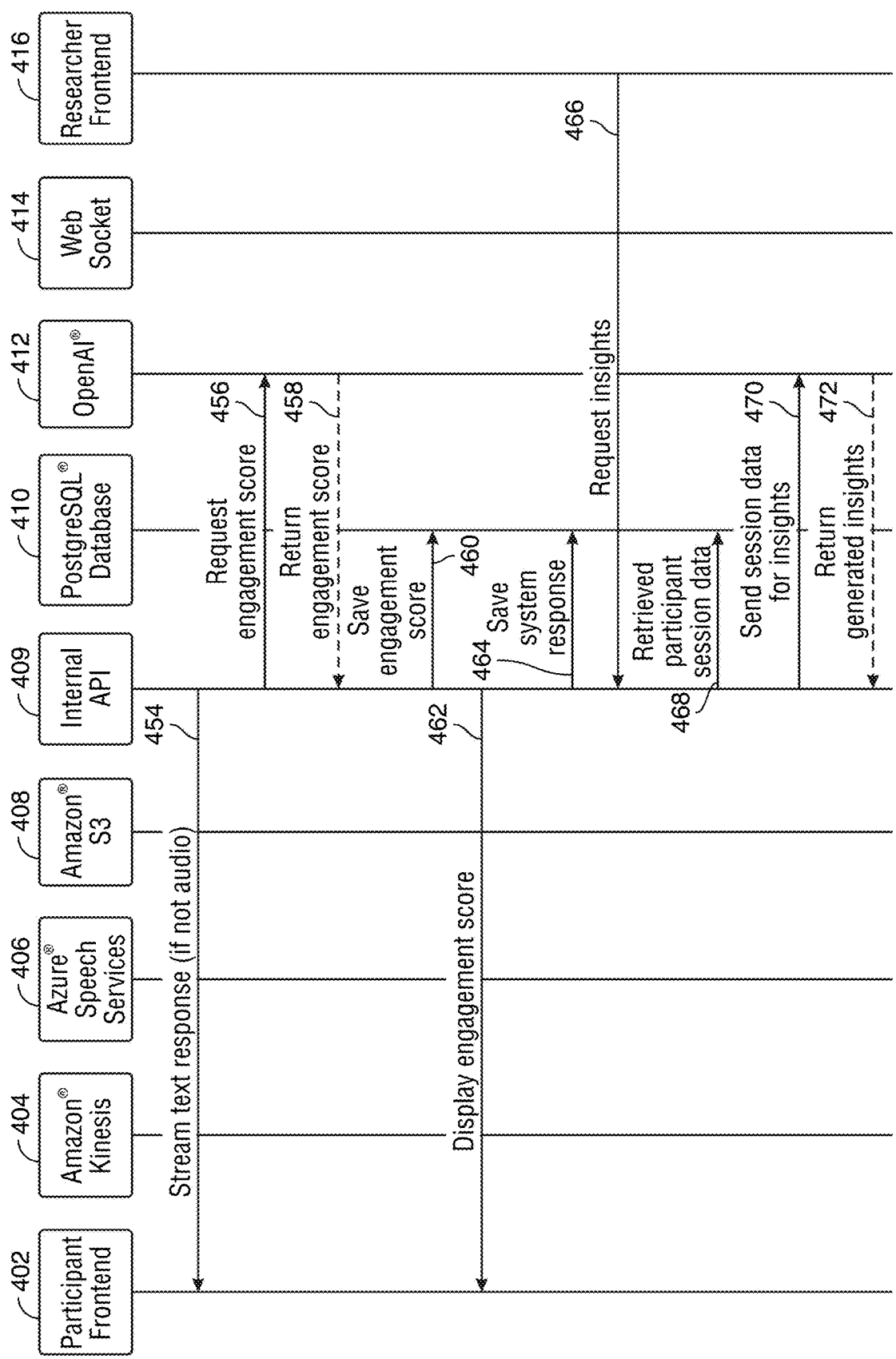
Figure 4D:
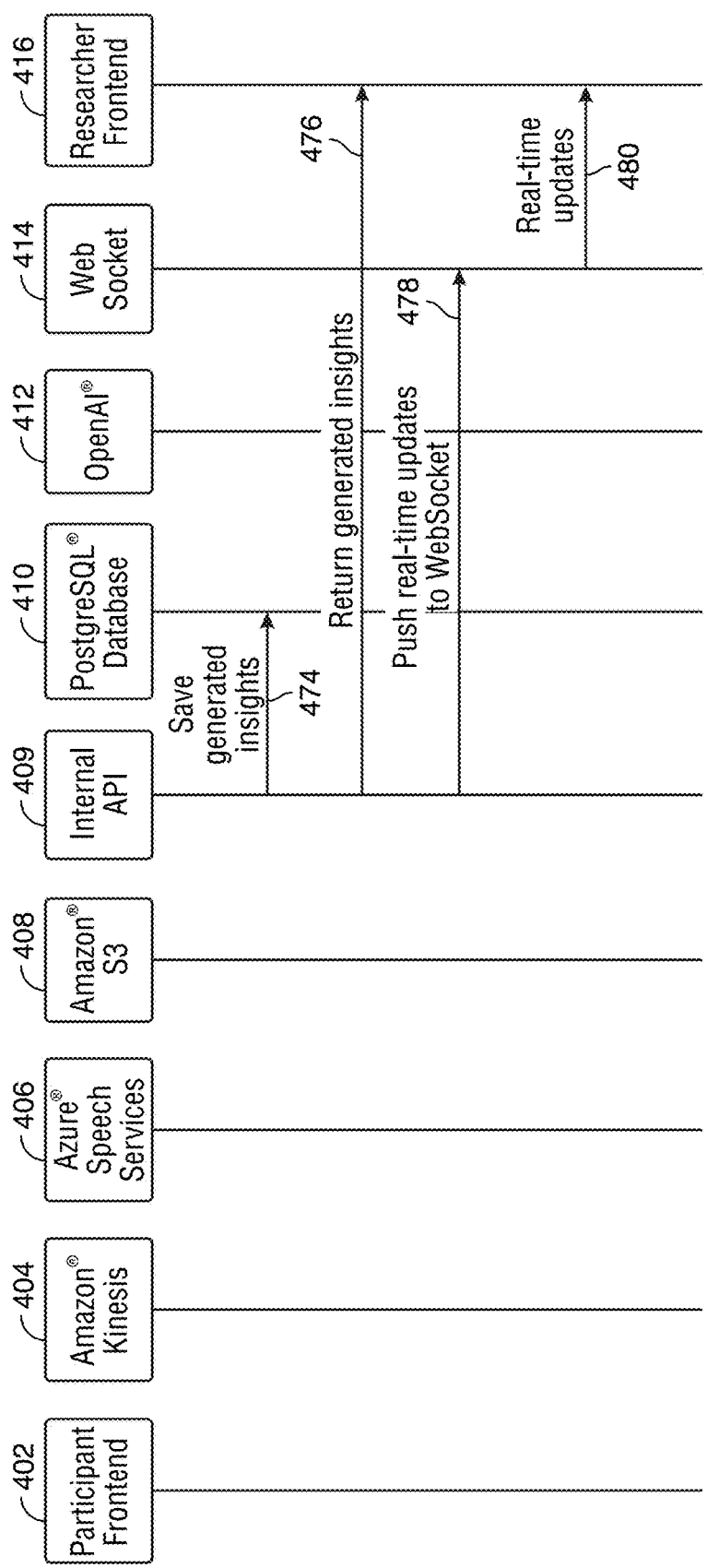

FIG. 3 shows an illustrative diagram. The illustrative diagram includes illustrative system architecture 302. Illustrative system architecture includes a participant user interface ("UI") swimlane 304, a backend swimlane 306 and a researcher UI swimlane 308.

As shown within researcher UI swimlane 308, a researcher may create a survey using a researcher UI 330. The researcher may interface with UI 330. UI 330 may communicate with backend 306 using researcher application programming interface ("API") 326. API 326 may provide the communication link between researcher UI 330 and the components included in backend swimlane 306. WebSocket 328 may provide researcher API 326 a connection to UI 330. WebSocket 328 may also provide UI 330 and/or API 326 a connection to a server.

As shown within backend swimlane 306, backend processing may support both the researcher UI and the participant UI. Backend processing may be inaccessible and unviewable to both the researcher and the participant(s).

Backend processing may include a large language model ("LLM") 320. LLM 320 may be instructed by researcher API 326 and participant API 316. LLM 320 may be created by OpenAI® or any other suitable entity.

Researcher API 326 and participant API 316 may communicate with database 318. Database 318 may be a PostgreSQL database. Database 318 may store information relating to the survey creation, as instructed by researcher API 326. Database 318 may also store information relating to each individual survey, as instructed by participant API 316.

Researcher API 326 and participant API 316 may also communicate with Amazon® S3 (Simple Storage Service) 324. Amazon S3 may provide object storage through a web service interface. Amazon S3 324 may store all types of objects.

The backend processing may also include Amazon Kinesis 322. Amazon Kinesis 322 may be a service that ingests, buffers and processes streaming data in real-time.

As shown within participant UI 304, a participant may take a survey using UI 310. UI 310 may utilize speech services script 312, such as an Azure® speech services script. Speech services script 312 may provide the capability for UI 310 to communicate with the participant using speech and audio.

Event streaming script 314 may track participant events. Participant events may include copying and pasting. Participant events may include leaving and/or returning to a webpage in the middle of a survey session. A survey session may include a participant participating in a survey. Participant event data may be used within a session recording feature. The session recording feature may record a survey session. Participant event data may also be used to flag participants that are not fully involved, or distracted, while participating in the survey.

Participant API 316 may enable communication between UI 310 and the backend processing. As such, participant API 316 may communicate with PostgreSQL database 318, openAI LLM 320, Amazon Kinesis 322 and Amazon S3 324.

FIGS. 4A, 4B, 4C and 4D show an illustrative diagram. The diagram shows an illustrative process of creating a survey, administering the survey and processing survey results. Columns 402 through 416 may be shown in FIGS. 4A, 4B, 4C and 4D. Communications 418 through 434 may be shown in FIG. 4A. Communications 436 through 452 may be shown in FIG. 4B. Communications 454 through 472 may be shown in FIG. 4C. Communications 474 through 480 may be shown in FIG. 4D.

Column 402 may correspond to a participant frontend. The participant frontend may interact with a participant. There may be multiple participants taking a survey. As such, the participant frontend may be individual for each participant.

Column 404 may correspond to Amazon Kinesis. Amazon Kinesis may be a service that ingests, buffers and processes streaming data in real-time. It should be noted that any suitable service may be used in connection with or in place of Amazon Kinesis.

Column 406 may correspond to Azure Speech Services. Azure Speech Services may be one or more services that enable a UI to communicate with a participant using speech and/or audio. It should be noted that any suitable service may be used in connection with or in place of Azure Speech Services.

Column 408 may correspond to Amazon S3. Amazon S3 may be a storage location operable to store objects using a web service interface. It should be noted that any suitable storage location may be used in connection with or in place of Amazon S3.

Column 409 may correspond to an internal API. The internal API may be an application programming interface used for backend processing.

Column 410 may correspond to a PostgreSQL database. The PostgreSQL database may be used to store data before, during and/or after the processing of each survey. It should be noted that any suitable database may be used in connection with or in place of the PostgreSQL database.

Column 412 may correspond to OpenAI. OpenAI may be an entity that creates LLMs. As such, column 412 may correspond to an LLM. It should be noted that any suitable LLM may be used in connection with or in place of the OpenAI.

Column 414 may correspond to a WebSocket. A WebSocket is a protocol that enables communication between a browser and a server. It should be noted that any suitable communication protocol may be used to enable communication between the browser and the server.

Column 416 may correspond to a researcher frontend. A researcher frontend may be a user interface that enables communication between the researcher and the survey creation system. The researcher frontend may enable a researcher to create a survey. The created survey may then be administered to a plurality of participants.

As shown at communication 418, a researcher, positioned at researcher frontend 416, may send a prompt to internal API 409. The prompt may include instructions to generate a project. The project may include a survey/interview which may be administered to a plurality of participants.

As shown at communication 420, internal API 409 may save the prompt and initiate the project at PostgreSQL database 410. As shown at communication 422, internal API 409 may send the prompt to OpenAI 412 for project generations. As shown at communication 424, OpenAI 412 may return project data to internal API 409.

As shown at communication 426, internal API 409 may push WebSocket update with project data to WebSocket 414. As shown at communication 428, WebSocket 414 may send a real-time update with project data to researcher frontend 416. The project data may be completed at researcher frontend 416. An instance of the survey may be transmitted to a plurality of participants. As such, communications 430 through 464 may be repeated for each participant.

As shown at communication 430, participant frontend 402 may send event data to Amazon Kinesis. As shown at communication 432, participant frontend 402 may save voice message to Azure Speech Services 406. Azure Speech Services 406 may process the voice message into text. As shown at communication 434, Azure Speech Services 406 may save participant audio to Amazon S3. The participant audio may be stored in voice format, text format or both voice and text format.

As shown at communication 436, Azure Speech Services 406 may return the transcription (in the event that the message was transmitted via voice) to participant frontend 402. Participant frontend 402 may display the transcription to the participant.

As shown at communication 438, participant frontend 402 may send a message (formatted in either text or transcribed voice or a combination of text and transcribed voice) to internal API 409.

As shown at communication 440, internal API 409 may save the message and pull context from PostgreSQL database 410. As shown at communication 442, internal API may send message and context to OpenAI 412. As shown at communication 444, OpenAI 412 may return an AI-generated response to internal API 409.

As shown at communication 446, internal API 409 may send speech text for synthesis to Azure Speech Services 406. As such, Azure Speech Services 406 may translate speech to text and text to speech. Communication 446 may be used in the event that speech or voice is the mode of communication between the participant and the participant frontend.

As shown at communication 448, Azure Speech Services 406 may save the AI synthesized audio to Amazon S3. As shown at communication 450, Amazon S3 408 may retrieve AI synthesized audio from internal API 409. As shown at communication 452, Azure Speech Services 406 may stream an audio response to participant frontend 402. The audio response may be streamed in the event that speech or voice is the mode of communication between the participant and the participant frontend. As shown at communication 454, internal API 409 may stream a text response to participant frontend 402 in the event that text is the mode of communication between the participant and the participant frontend.

As shown at communication 456, internal API 409 may request an engagement score from OpenAI 412. As shown at communication 458, OpenAI may return an engagement score to internal API 409. As shown at communication 460, internal API may save the engagement score to PostgreSQL Database 410. As shown at communication 462, internal API may display the engagement score on participant frontend 402. As shown at communication 464, internal API 409 may save the system response to PostgreSQL database 410.

Upon completion of the survey by one or more survey takers and/or upon completion of the survey by all or substantially all of the survey takers, a researcher may be enabled to request insights regarding the surveys. As shown at communication 466, researcher frontend 416 may request insights from internal API 409.

As shown at communication 468, internal API may retrieve participant session data from PostgreSQL database 410. As shown at communication 470, internal API 409 may send session data to OpenAI 412 to identify insights. As shown at communication 472, OpenAI 412 may return generated insights to internal API 409.

As shown at communication 474, internal API 409 may save the generated insights to PostgreSQL database 410. As shown at communication 476, internal API 409 may return generated insights to researcher frontend 416. As shown at communication 478, internal API 409 may push real-time updates to WebSocket 414. As shown at communication 480, WebSocket 414 may forward the real-time updates to researcher frontend 480.

Figure 5:
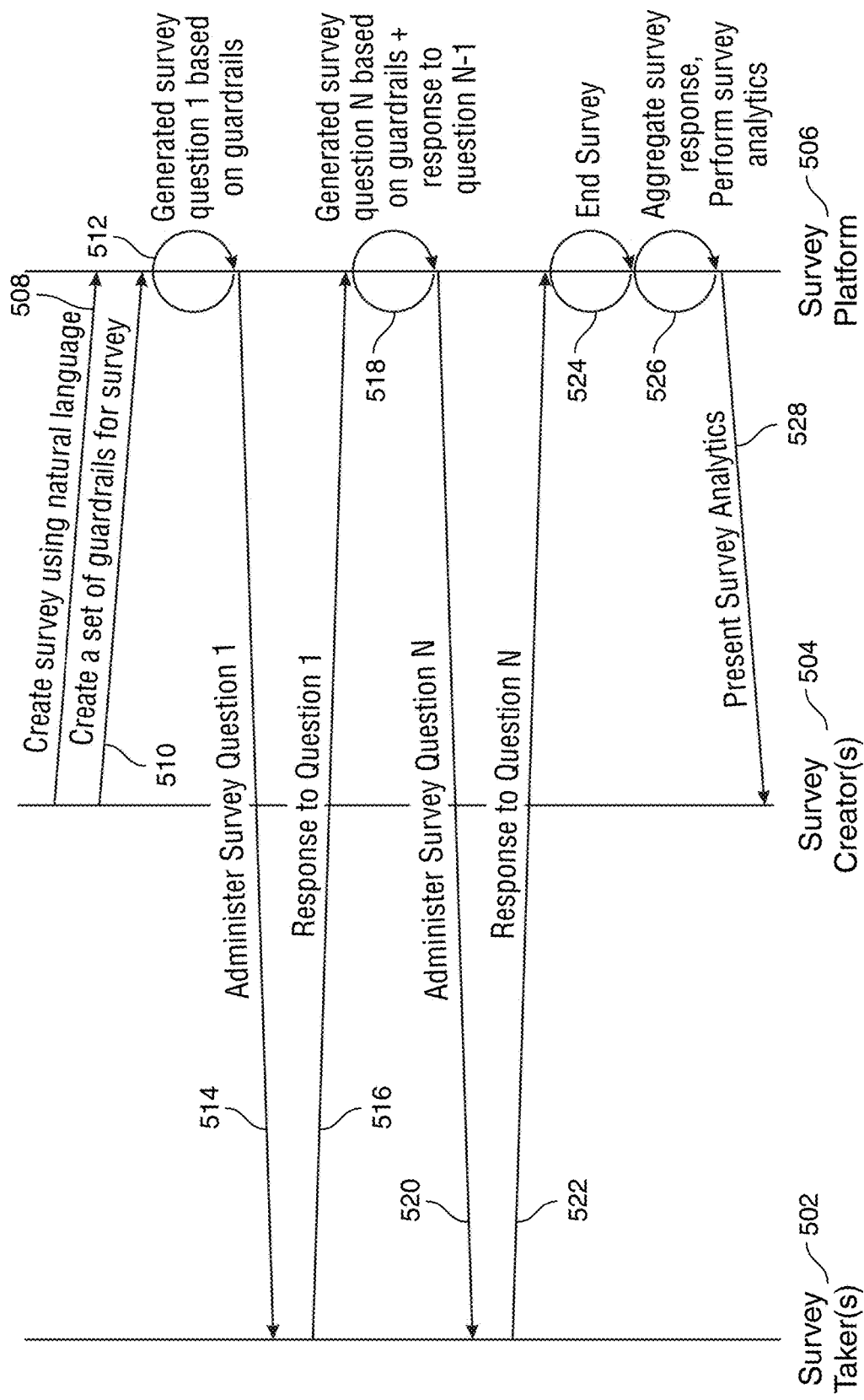
FIG. 5 shows yet another illustrative diagram in accordance with principles of the disclosure.

FIG. 5 shows an illustrative diagram. The illustrative diagram shows an illustrative process flow for an artificially intelligent natural language survey system. The process flow may involve one or more survey takers 502, one or more survey creators 504 and a survey platform 506.

Survey creator 504 may create a survey using natural language at survey platform 506, as shown at 508. Survey creator 504 may create a set of guardrails for the survey at survey platform 506, as shown at 510. Survey platform 506 may generate survey question 1 based on the guardrails, as shown at 512.

Survey platform 506 may administer survey question 1 to survey taker 502, as shown at 514. Survey taker 502 may transmit a response to question to 1 to Survey platform 506. Survey platform 506 may generate survey question N based on the guardrails and the response to question N–1 (N minus one), as shown at 518. As such, a question generated by survey platform 506 may be based on the most recent response of the survey taker, the guardrails and/or any other previously received information. It should be noted that the previously received information may include information provided by the survey taker in earlier responses. It should also be noted that the previously received information may also include demographic or other information that may be input into the system memory. Such information may be retrieved from various sources, including information provided by the survey taker and/or information retrieved by one or more information retrieval systems, such as web crawlers.

Survey platform 506 may administer survey question N to survey taker 502, as shown at 520. Survey taker 502 may transmit a response to question N to survey platform 506, as shown at 522. Survey platform 506 may end survey, as shown at 524. Survey platform 506 may aggregate survey response and perform survey analytics, as shown at 526. Survey platform 506 may present or display survey analytics to survey creator 504, as shown at 528. It should be noted that the survey analytics may be processed after a survey has been administered to one or more participants. The survey analytics may be processed after a survey has been administered to all, or substantially all, participants. The survey analytics may be processed after a predetermined amount of time has been provided to participants.

Figure 6:
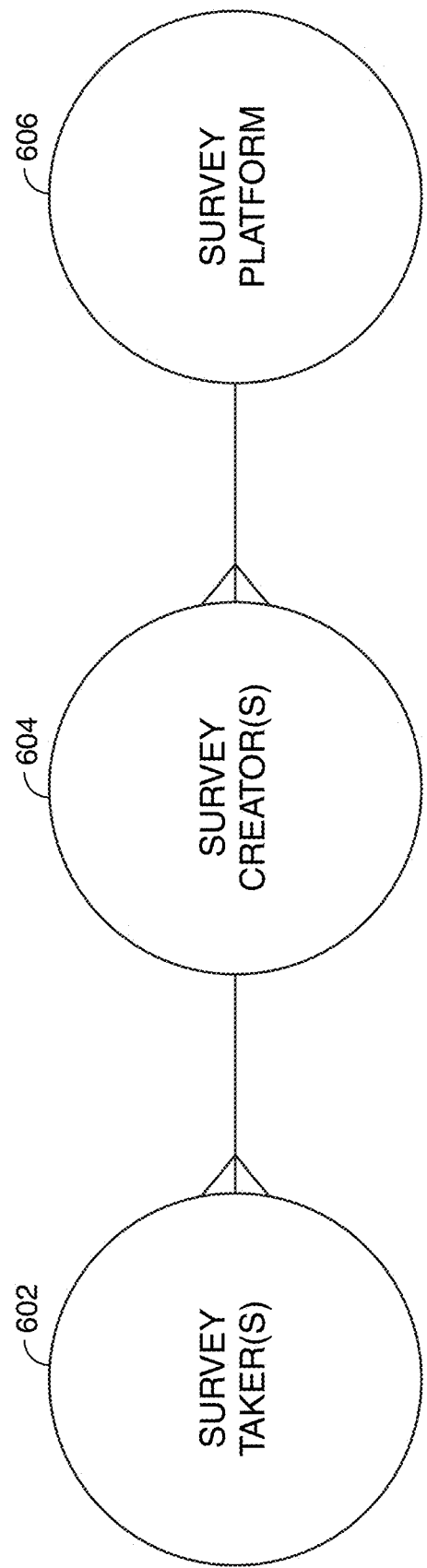
FIG. 6 shows still another illustrative diagram in accordance with principles of the disclosure.

FIG. 6 shows an illustrative diagram. The illustrative diagram shows an illustrative relationship between entities in an artificially intelligent natural language survey system. There may be a single survey platform, shown at 606. The single survey platform may enable multiple survey creators, shown at 604, to create surveys. Each survey created by a survey creator may be administered to multiple survey takers, shown at 602.

Figure 7:
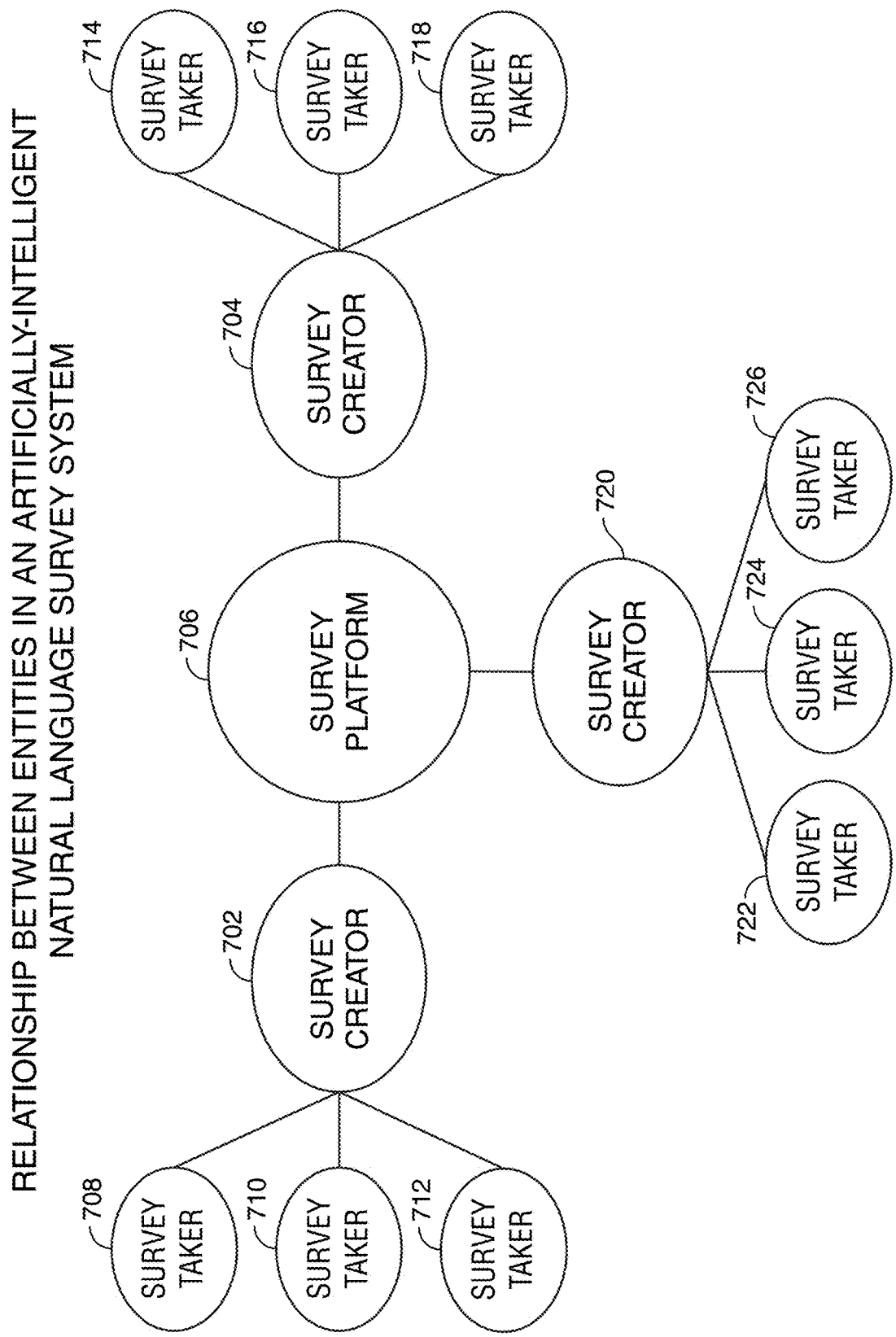
FIG. 7 shows yet another illustrative diagram in accordance with principles of the disclosure.

FIG. 7 shows an illustrative diagram. The illustrative diagram shows an illustrative relationship between entities in an artificially intelligent natural language survey system. Survey platform 706 may enable survey creators 702, 704 and 720 to each generate a survey. Each generated survey may be a unique stand-alone survey. A survey generated by survey creator 702 may be administered to survey takers 708, 710 and 712. A survey generated by survey creator 720 may be administered to survey takers 722, 724 and 726. A survey generated by survey creator 704 may be administered to survey takers 714, 716 and 718.

Figure 8:
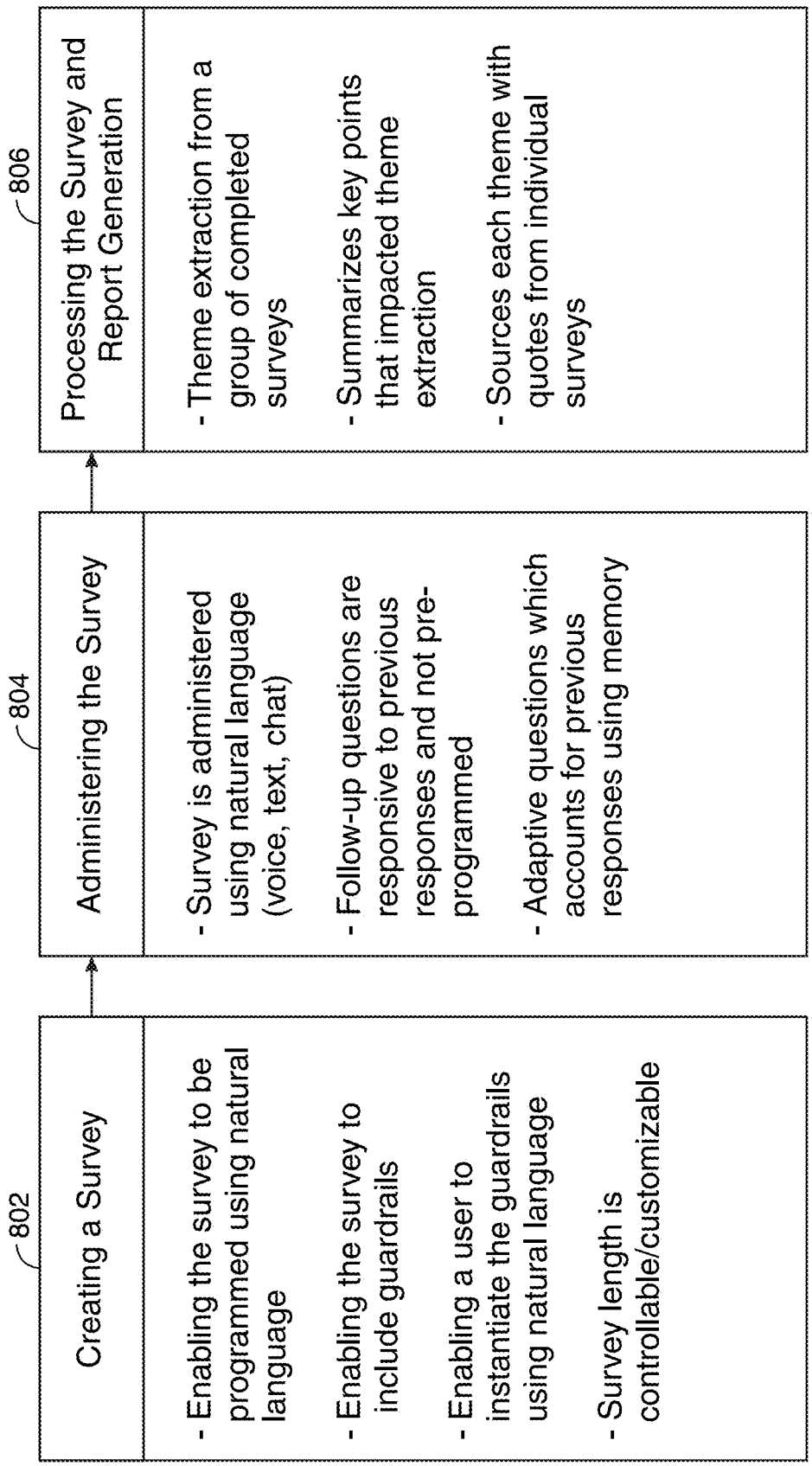
FIG. 8 shows still another illustrative diagram in accordance with principles of the disclosure.

FIG. 8 shows an illustrative diagram. The illustrative diagram shows methods for implementing a natural language survey system. Step 802 shows creating a survey. Step 804 shows administering the survey. Step 806 shows processing the survey and report generation.

There may be a plurality of attributes associated with creating a survey (step 802). These attributes may include enabling the survey to be programmed using natural language. These attributes may also include enabling the survey to include guardrails. These attributes may also include enabling a user to instantiate the guardrails using natural language. These attributes may also include the ability for a survey creator control and/or customize survey length.

There may be a plurality of attributes associated with administering the survey (step 804). These attributes may include administering the survey using natural language in modes such as voice, text, chat and/or a combination of such modes. These attributes may also include enabling the system to provide follow-up questions that are responsive to previous responses and not pre-programmed. These attributes may also include enabling the system to provide adaptive questions which accounts for previous responses using memory.

There may be a plurality of attributes associated with processing the survey and report generation (step 806). These attributes may include extracting one or more themes from a group of completed surveys. These attributes may include summarizing key points that impact theme extraction. These attributes may include sourcing each theme with quotes from individual surveys.

FIG. 9 shows an illustrative diagram. The illustrative diagram shows attributes of a natural language survey system. The attributes of the natural language survey system may include an AI moderator, shown at 902, AI prespecified personalities, shown at 904, engagement score subsystem, shown at 906 and test harness, shown at 908.

AI moderator 902 may moderate a survey and/or attribute. AI moderator 902 may identify issues, such as toxicity, unhealth or inappropriateness during an interview. AI moderator 902 may flag issues and moderate the flagged issues. AI moderator 902 may remove flagged issues from the study results.

AI prespecified personalities 904 may include a set of AI personalities. The set of AI personalities may test surveys prior to exposure to live subjects. The AI personalities may represent various types of subjects, such as easy subjects that intend to respond with correct answers, and difficult subjects that intend to respond with incorrect answers.

Engagement score subsystem 906 may include identifying a continuously updating engagement score that measures the extent to which the participant is engaged in the survey. Engagement score subsystem 906 may operate in real-time during communication between the survey taker and the natural language survey system. Engagement score subsystem 906 may include a graphical display of the real-time engagement score. The graphical display may be displayed to the participant. Engagement score subsystem 906 may tag each subject's response with a per-response engagement score and/or a cumulative engagement score. Engagement score subsystem may tag each completed survey with a final engagement score. The final engagement score may be cumulative of the completed survey.

Test harness 908 may include a suite of tests and a set of tools to measure the quality of the system. Test harness 908 may measure the system quality upon completion of surveys. As such, test harness 908 may, at times, not operate in real-time as a user is taking the survey. Test harness 908 may test the quality of a survey when using a first LLM to the quality of the same survey when using a second LLM. As such, test harness 908 may identify the benefits and faults of a first LLM when compared to a second LLM.

Figure 10:
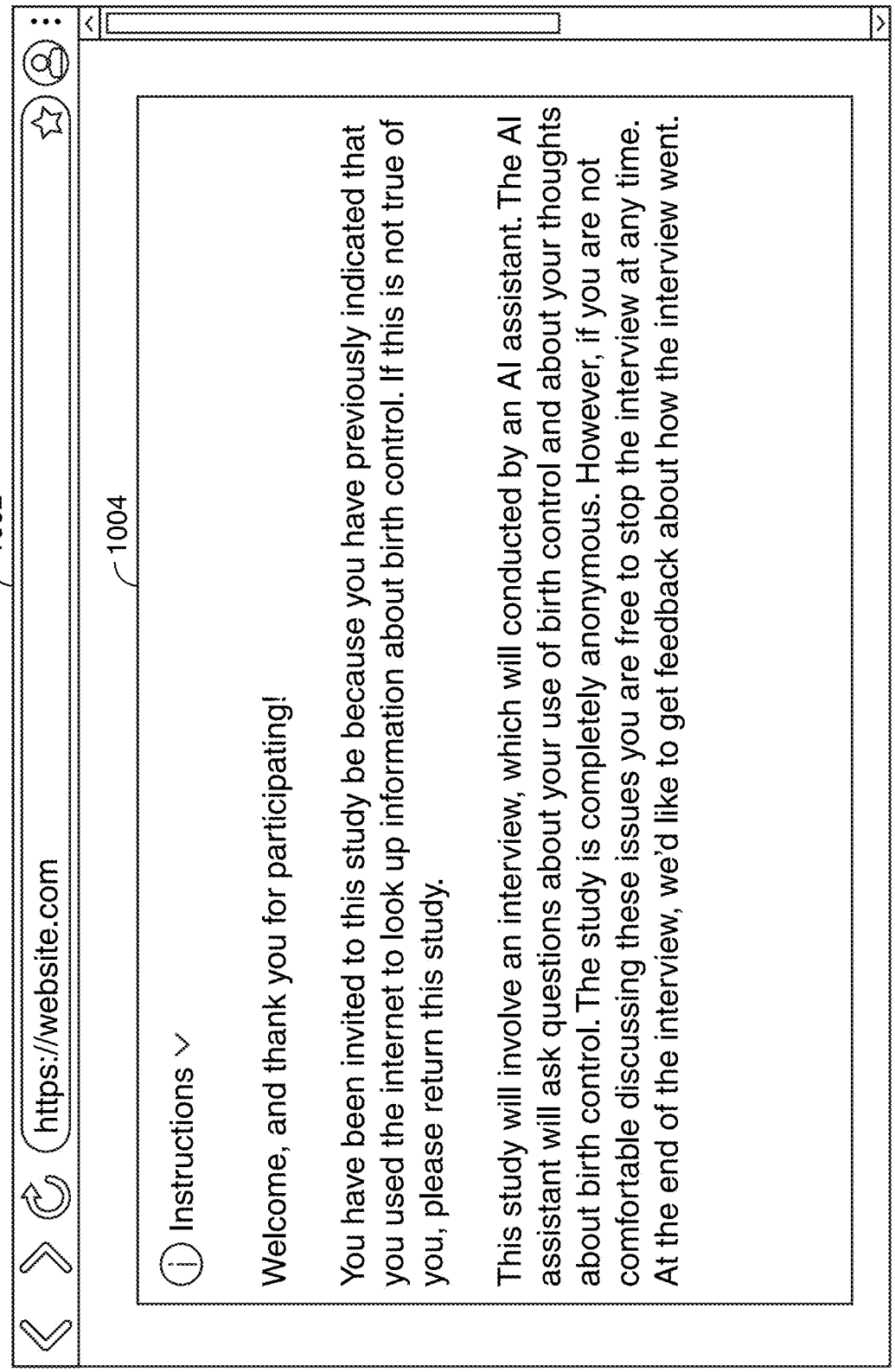
FIG. 10 shows still another illustrative diagram in accordance with principles of the disclosure.

FIG. 10 shows an illustrative diagram. The illustrative diagram shows illustrative website 1002. Illustrative website 1002 may include a participant UI display. The participant UI display may include text box 1004. Text box 1004 includes instructions directed to a participant on participation in the survey.

FIG. 11 shows an illustrative diagram. The illustrative diagram shows illustrative researcher UI display 1102. Researcher UI display 1102 enables a researcher to create a survey. The survey in creation includes a first open-ended question, shown at 1104. The first open-ended question includes follow-up instructions, shown at 1106. The follow-up instructions, shown at 1106, may instruct the researcher to identify the objectives for the question and how to follow-up on the question. The researcher may input the objectives and the follow-up instructions, as shown at 1108.

Figure 12:
FIG. 12 shows still another illustrative diagram in accordance with principles of the disclosure.

FIG. 12 shows an illustrative diagram. The illustrative diagram shows an illustrative researcher UI display 1202. Researcher UI display 1202 enables a researcher to create a survey. The survey in creation includes a second open-ended question, shown at 1204. The second open-ended question includes follow-up instructions, shown at 1206. The follow-up instructions, shown at 1206, may instruct the researcher to identify objectives for the question and how to follow-up on the question. The researcher may input the objectives and the follow-up instructions, as shown at 1208.

FIG. 13 shows an illustrative diagram. The illustrative diagram shows an illustrative researcher UI display 1302. Researcher UI display 1302 enables a researcher to create a survey. The survey in creation includes a multi-choice question, shown at 1304. The multi-choice question includes a set of answer options to be presented to the survey taker, as shown at 1306. The researcher may not have included follow-up instructions for the multi-choice question.

FIG. 14 shows an illustrative diagram. The illustrative diagram shows an illustrative researcher UI display 1402. Researcher UI display 1402 enables a researcher to create a survey. The survey in creation includes an open-ended question, as shown at 1404. The researcher may not have included follow-up instructions, as shown at the empty text box 1406.

FIG. 15 shows an illustrative diagram. The illustrative diagram shows an illustrative researcher UI display 1502. Researcher UI display 1502 enables a researcher to create a survey. The survey in creation includes a multi-choice question, shown at 1504. The multi-choice question includes a set of answer options to be presented to the survey taker, as shown at 1406. The researcher may include follow-up instructions for the multi-choice question, as shown at 1508. The researcher may have entered textual follow-up instructions, as shown at 1510.

Figure 16:
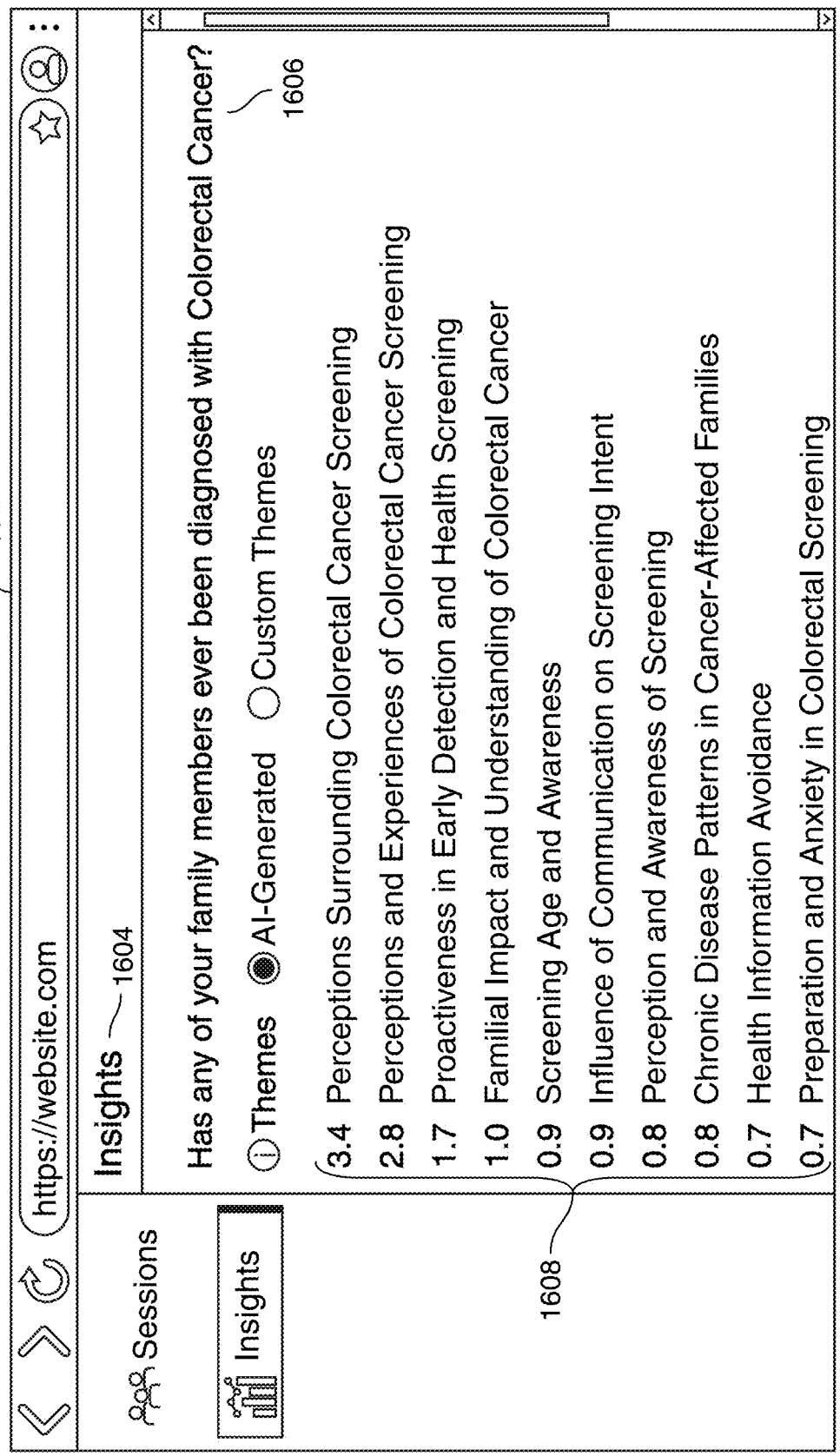
FIG. 16 shows still another illustrative diagram in accordance with principles of the disclosure.

FIG. 16 shows an illustrative diagram. The illustrative diagram shows an illustrative researcher UI display 1602. The illustrative researcher UI display 1602 may include a set of insights. The set of insights may include aggregated information from a survey administered to one or more participants. The researcher may be able to select one or more AI-generated themes or one or more custom theme. The question presented to the participants may be shown at 1606. The one or more AI-generated themes may be shown at 1608.

FIG. 17 shows an illustrative diagram. The illustrative diagram shows an illustrative researcher UI display 1702. The illustrative researcher UI display 1702 may include a plurality of themes and summaries of each theme. Themes may be shown at interactive text box 1704, interactive text box 1706, interactive text box 1708 and interactive text box 1710.

FIG. 18 shows an illustrative diagram. The illustrative diagram shows an illustrative researcher UI display 1802. The illustrative researcher UI display 1802 may include summary 1804. Summary 1804 may include an AI-generated summary for a completed survey administered to a plurality of survey participants. The AI-generated summary may include one or more themes and/or one or more subthemes.

FIG. 19 shows an illustrative diagram. The illustrative diagram shows an illustrative researcher UI display 1902. The illustrative researcher UI display 1902 may include summary 1904. Summary 1904 may be a summary of a particular survey administered to a single participant. As such, for a survey administered to multiple participants, multiple survey summaries may be available. It should be noted that the different displays within the researcher UI may be linked. As such, a researcher may be able to click and transfer viewing between the researcher UI displays in order to understand the subject matter at a deeper level.

The steps of methods of the disclosure may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems for an artificially intelligent natural language survey system and methods for operating such a system are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for adaptively processing results of a customized natural language survey communicated through an artificially intelligent engine operating on a large language model, the system comprising:
   a memory, said memory operable to receive a plurality of recordings;
   a processor operating with the large language model, said processor operable to:
      convert, using one or more speech-to-text conversion systems, the plurality of recordings into a plurality of transcripts;
      use the artificial intelligence engine to process the plurality of transcripts sequentially by:
         extracting one or more themes from a first transcript within the plurality of transcripts;
         adding the one or more themes to a running list of themes;
         processing a transcript following the first transcript, said processing comprising the ability to add additional themes to the running list of themes and/or apply themes included in the running list of themes; and
         retrieving quotes from the plurality of transcripts that relate to themes included in the running list of themes; and
   an interface operable to present an analysis of the plurality of transcripts, said analysis comprising the running list of themes and one or more of the retrieved quotes associated with the themes.

2. The system of claim 1 wherein the plurality of recordings comprises:
   real-time communications between an artificial intelligence system and a human;
   real-time conversational surveys between a survey participant and a natural language survey system;
   historical communications between an artificial intelligence system and a human;
   historical conversational surveys between a survey participant and a natural language survey system;
   conversations between two or more humans;
   dialogue of one or more humans;
   transcripts of conversations; and/or
   dialogue of one or more humans.

3. The system of claim 1 wherein the processor is further operable to:
   receive one or more themes in natural language;
   using artificial intelligence to process the plurality of transcripts sequentially by:
      analyzing the one or more themes as applied to each transcript included within the plurality of transcripts; and
      retrieving quotes from the plurality of transcripts that relate to themes included in the running list of themes;
   an interface operable to present an analysis of the plurality of transcripts, said analysis comprising the one or more themes and one or more of the retrieved quotes associated with the one or more themes.

4. The system of claim 1 wherein each response of each survey participant is tagged with a cumulative engagement score that measures an extent, up to and including the tagged response, that the survey participant engaged in the conversational survey.

5. The system of claim 1 wherein each conversational survey is tagged with an engagement score that measures an extent that the survey participant engaged in the conversational survey.

6. The system of claim 1 wherein the processor is operable to flag and remove a first set of survey participants from participating in surveys, said first set of survey participants associated with conversational surveys tagged with engagement scores that score below a predetermined threshold.

7. The system of claim 1 further comprising a test harness, said test harness operable to compare a quality of survey results using a first large language model to a quality of survey results using a second large language model.

8. The system of claim 1 wherein the processor is further operable to:
   ingest the analysis of the plurality of transcripts;
   generate one or more additional survey questions; and
   resume one or more conversational surveys, included in the plurality of conversational surveys, by presenting the additional survey questions to a survey participant.

9. A method for adaptively processing results of a customized natural language survey communicated through an artificially intelligent engine operating on a large language model, the method comprising:
   receiving a plurality of recordings, said plurality of recordings relating to conversational surveys between a survey participant and a natural language survey system;
   converting, at a processor operating with the large language model, using one or more speech-to-text conversion systems, the plurality of conversational surveys into a plurality of transcripts;
   processing, using artificial intelligence at the processor, the plurality of transcripts sequentially by:
      extracting one or more themes from a first transcript within the plurality of transcripts;
      adding the one or more themes to a running list of themes;
      processing a second transcript, said second transcript following the first transcript, said processing the second transcript comprising:
         adding one or more additional themes to the running list of themes; and/or
         applying and linking one or more themes, included in the running list of themes, to the second transcript;
      retrieving quotes from the plurality of transcripts that relate to themes included in the running list of themes; and
   displaying, on an interface, an analysis of the plurality of transcripts, said analysis comprising the running list of themes and one or more of the retrieved quotes associated with the themes.

10. The method of claim 9 further comprising:
    receiving a theme in natural language;
    processing, using artificial intelligence, the plurality of transcripts sequentially by:

analyzing the theme as applied to each transcript included within the plurality of transcripts; and
retrieving quotes from the plurality of transcripts that relate to the theme;
displaying, on an interface, an analysis of the plurality of transcripts, said analysis comprising the theme and one or more of the retrieved quotes associated with the theme.

11. The method of claim 9 further comprising tagging each response of each survey participant with a cumulative engagement score that measures an extent, up to and including the tagged response, that the survey participant engaged in the conversational survey.

12. The method of claim 9 further comprising tagging each conversational survey with an engagement score that measures an extent that the survey participant engaged in the conversational survey.

13. The method of claim 9 further comprising testing, using a test harness, a first large language model and a second large language model, said testing comprising comparing a quality of survey results when the processor is operating with the first large language model to a quality of survey results when the processor is operating with the second large language model.

14. The method of claim 9 further comprising, at the processor:
ingesting the analysis of the plurality of transcripts;
generating one or more additional survey questions; and
resuming one or more conversational surveys, included in the plurality of conversational surveys, by presenting the additional survey questions to a survey participant.

15. The method of claim 9 further comprising, flagging and removing a first set of survey participants from participating in surveys, said first set of survey participants associated with conversational surveys tagged with engagement scores that score below a predetermined threshold.

16. The method of claim 9, further comprising:
adaptively detecting, at an artificial intelligence engine operating on the large language model, one or more suggestions, said one or more suggestions comprising one or more additional survey questions, said one or more additional survey questions designed to obtain targeted results from the survey, said targeted results that align with the one or more survey goals; and
displaying, on the graphical user interface, the one or more suggestions.

17. The method of claim 9, further comprising:
perusing, by an artificially intelligent engine operating on the large language model, a design of the survey; and
adaptively generating, by the artificially intelligent engine, one or more analysis processes to execute on survey data to be collected.

18. The method of claim 9, further comprising:
perusing, by an artificially intelligent engine operating on the large language model, a design of the survey; and
adaptively generating one or more research queries, said one or more research queries operable to extract a plurality of themes from the collected data; and
revising said design of the survey based at least in part on at least one of the plurality of extracted themes.

19. The method of claim 9, further comprising:
perusing, prior to the survey being communicated to one or more survey participants, by an artificially intelligent engine operating on the large language model, a design of the survey; and
adaptively generating one or more research queries, said one or more research queries operable to extract a plurality of themes from collected data; and
revising said design of the survey based at least in part on at least one of the plurality of extracted themes.

\* \* \* \* \*